(12) United States Patent
Li et al.

(10) Patent No.: US 12,103,589 B2
(45) Date of Patent: Oct. 1, 2024

(54) ALL-TERRAIN VEHICLE AND BODY THEREOF

(71) Applicant: SEGWAY TECHNOLOGY CO., LTD., Changzhou (CN)

(72) Inventors: Xiang Li, Changzhou (CN); Ge Fan, Changzhou (CN)

(73) Assignee: SEGWAY TECHNOLOGY CO., LTD. (CN)

( * ) Notice: Subject to any disclaimer, the term of this patent is extended or adjusted under 35 U.S.C. 154(b) by 219 days.

(21) Appl. No.: 17/730,450

(22) Filed: Apr. 27, 2022

(65) Prior Publication Data

US 2022/0250685 A1    Aug. 11, 2022

Related U.S. Application Data

(63) Continuation of application No. PCT/CN2020/125581, filed on Oct. 30, 2020.

(30) Foreign Application Priority Data

Nov. 1, 2019    (CN) .......................... 201911061005.4

(51) Int. Cl.
*B62D 21/18*    (2006.01)
*B60G 13/00*    (2006.01)
(Continued)

(52) U.S. Cl.
CPC ........... *B62D 21/183* (2013.01); *B60G 13/00* (2013.01); *B60G 13/003* (2013.01); *B60N 2/015* (2013.01);
(Continued)

(58) Field of Classification Search
CPC .... B62D 21/183; B62D 23/005; B62D 21/18; B62D 21/11; B62D 25/00; B62D 25/02;
(Continued)

(56) References Cited

U.S. PATENT DOCUMENTS 7,650,959 B2 *   1/2010  Kato .................... B60G 7/02
                                              180/311
7,802,816 B2 *   9/2010  McGuire ............... B60G 7/008
                                              180/311
(Continued)

FOREIGN PATENT DOCUMENTS

CN          2883145 Y      3/2007
CN          2889866 Y      4/2007
(Continued)

*Primary Examiner* — Timothy Wilhelm
(74) *Attorney, Agent, or Firm* — Emerson, Thomson, & Bennett, LLC; Roger D. Emerson; Matt J. Wilson

(57) ABSTRACT

An all-terrain vehicle and a body thereof are provided. The body includes: a vehicle frame and a seat frame. The vehicle frame includes a front part, a middle part, and a rear part, connected in sequence. The rear part is provided with a power compartment for accommodating a power train. The front part includes a lower mounting frame and an upper support frame, the lower mounting frame is connected to the middle part, and the upper support frame can be detachably connected to both the lower mounting frame and the middle part. The seat frame is detachably arranged in the middle part and defines, with a bottom of the middle part, a mounting space for a plurality of components.

20 Claims, 15 Drawing Sheets

(51) Int. Cl.
*B60N 2/015* (2006.01)
*B62D 21/11* (2006.01)
*B62D 23/00* (2006.01)
*B62D 25/00* (2006.01)
*B62D 25/02* (2006.01)
*B62D 25/08* (2006.01)

(52) U.S. Cl.
CPC .............. *B62D 21/11* (2013.01); *B62D 21/18* (2013.01); *B62D 23/005* (2013.01); *B62D 25/00* (2013.01); *B62D 25/02* (2013.01); *B62D 25/08* (2013.01)

(58) Field of Classification Search
CPC ...... B62D 25/08; B60G 13/00; B60G 13/003; B60N 2/015
See application file for complete search history.

(56) References Cited

U.S. PATENT DOCUMENTS

| | | | | |
|---|---|---|---|---|
| 7,819,220 B2* | 10/2010 | Sunsdahl | ............ | B60K 17/348 180/312 |
| 8,302,724 B2* | 11/2012 | Gillingham | .......... | B60K 17/346 180/242 |
| 8,328,235 B2* | 12/2012 | Schneider | ............ | B62D 21/183 296/146.1 |
| 8,469,137 B2* | 6/2013 | Fujii | .................... | B62D 23/005 180/312 |
| 8,613,336 B2* | 12/2013 | Deckard | ................ | B60K 17/08 180/68.3 |
| 8,746,394 B2* | 6/2014 | Kuramoto | ............. | B60K 17/34 180/292 |
| 8,973,693 B2* | 3/2015 | Kinsman | ................ | B60R 21/13 296/202 |
| 9,102,205 B2* | 8/2015 | Kvien | ..................... | B60G 3/20 |
| 9,103,424 B2* | 8/2015 | Mitsubori | ............. | F16H 37/043 |
| 9,162,558 B2* | 10/2015 | Stenberg | ............... | B60L 53/18 |
| 9,327,587 B2* | 5/2016 | Spindler | ................. | B60G 3/00 |
| 9,649,924 B2* | 5/2017 | Nakaoka | ................ | B60K 5/04 |
| 9,650,078 B2* | 5/2017 | Kinsman | .............. | B60G 21/055 |
| 9,771,112 B2* | 9/2017 | Spindler | ................ | B60K 13/02 |
| 9,789,909 B2* | 10/2017 | Erspamer | ............... | B60J 5/0487 |
| 9,878,650 B2* | 1/2018 | Reed | ..................... | B60N 2/012 |
| 9,994,260 B2* | 6/2018 | Ito | ........................ | B62D 21/152 |
| 10,246,153 B2* | 4/2019 | Deckard | ................. | B60N 2/58 |
| 10,450,006 B2* | 10/2019 | Kinsman | ................ | B62D 21/183 |
| 10,479,422 B2* | 11/2019 | Hollman | ................. | F16D 9/06 |
| 10,780,770 B2* | 9/2020 | Kohler | ..................... | B60K 6/40 |
| 10,988,187 B2* | 4/2021 | Schounard | ............ | B62D 25/04 |
| 11,273,881 B2* | 3/2022 | Deckard | ................. | B60R 22/00 |
| 11,787,279 B2* | 10/2023 | Ward | ...................... | B60K 5/04 180/311 |
| 2012/0223500 A1* | 9/2012 | Kinsman | ............. | B62D 27/065 180/312 |
| 2013/0060410 A1* | 3/2013 | Crain | ..................... | B60L 50/62 180/65.6 |
| 2014/0187372 A1* | 7/2014 | Kouma | ................. | B60K 5/1216 474/150 |
| 2015/0259011 A1* | 9/2015 | Deckard | ................ | B60K 13/04 280/781 |
| 2017/0174069 A1* | 6/2017 | Oyama | ................. | B60R 21/131 |
| 2018/0251173 A1 | 9/2018 | Kirtland et al. | | |

FOREIGN PATENT DOCUMENTS

| | | |
|---|---|---|
| CN | 201151445 Y | 11/2008 |
| CN | 103264726 A | 8/2013 |
| CN | 109318691 A | 2/2019 |
| CN | 211543691 U | 9/2020 |
| CN | 211685323 U | 10/2020 |
| CN | 101925505 A | 12/2020 |

\* cited by examiner

ALL-TERRAIN VEHICLE AND BODY THEREOF

CROSS REFERENCE TO RELATED APPLICATION

The present disclosure is a continuation of international application No. PCT/CN2020/125581 filed on Oct. 30, 2020, which claims priority to Chinese Patent Application No. 201911061005.4 filed on Nov. 1, 2019, and entitled "ALL-TERRAIN VEHICLE AND BODY THEREOF", which are incorporated herein by reference.

TECHNICAL FIELD

The present disclosure relates to the technical field of vehicles, in particular to an all-terrain vehicle and a body thereof.

BACKGROUND

An all-terrain vehicle refers to a vehicle that can travel on any terrain and can traverse freely on the terrain where ordinary vehicles are difficult to maneuver. The all-terrain vehicle is commonly referred to as a dune buggy in China. Such a vehicle has many uses and is not limited by road conditions, which is widely used in North America and Western Europe, showing an increasing trend year by year.

In the related technology, in the all-terrain vehicle, the seat frame and the vehicle frame are usually welded integrally. The welded structure after the seat frame and the vehicle frame are welded has a large size, which is difficult to ensure the dimensional accuracy and hinders the utilization of the lower space of the vehicle. In addition, different front shapes and different additional components correspond to different frames. If the front shapes need to be changed and components need to be added, the frame needs to be redesigned, which leads to higher cost and poor versatility.

SUMMARY

The present disclosure aims at solving at least one of the technical problems existing in the prior art. Therefore, an object of the present disclosure is to provide a body of an all-terrain vehicle, which is capable of reasonably utilizing the lower space, easy to mount and disassemble, good in versatility, and convenient to change the front shape.

The present disclosure further provides an all-terrain vehicle.

According to the embodiment of a first aspect of the present disclosure, a body of an all-terrain vehicle is provided. The all-terrain vehicle includes a vehicle frame and a seat frame. The vehicle frame includes a front part, a middle part and a rear part which are connected in sequence, the rear part is provided with a power compartment for accommodating a power train, the front part includes a lower mounting frame and an upper support frame, the lower mounting frame is connected to the middle part, and the upper support frame is detachably connected to both the lower mounting frame and the middle part. The seat frame is detachably provided in the middle part and defines a mounting space for a plurality of components with a bottom of the middle part.

According to the embodiment of the present disclosure, the middle part includes an outer side pipe, an inner longitudinal beam and a bottom plate, the inner longitudinal beam is located inside the outer side pipe, and the bottom plate is connected between the outer side pipe and the inner longitudinal beam, and the bottom plate forms the bottom of the mounting space.

According to some specific embodiments of the present disclosure, a number of the inner longitudinal beam is two, the two inner longitudinal beams are disposed transversely opposite to each other, and a mounting space for a transmission shaft of the all-terrain vehicle is defined by the two inner longitudinal beams.

According to some specific embodiments of the present disclosure, a number of the inner longitudinal beam is two, the two inner longitudinal beams are provided transversely opposite to each other, and the two inner longitudinal beams define the mounting space of a transmission shaft of the all-terrain vehicle.

According to some specific embodiments of the present disclosure, a number of the outer side pipe is plural, the plurality of outer side pipes are connected in sequence, the outer side pipe on the front side is connected to the front end of the inner longitudinal beam, and the outer side pipe on the rear side is connected to the rear end of the inner longitudinal beam.

According to some specific embodiments of the present disclosure, the plurality of outer side pipes include a first outer side pipe, a second outer side pipe and a third outer side pipe, there are two first outer side pipes and two second outer side pipes which are both disposed outside the two inner longitudinal beams, the first outer side pipe is obliquely connected between the inner longitudinal beam and the second outer side pipe, and the third outer side pipe is connected to the rear end of the two inner longitudinal beams, and both ends of the third outer side pipe are connected to two of the second outer side pipes; and the middle part further includes a front inclined pipe and a front support frame, the front support frame is connected to the first outer side pipe, the front inclined pipe extends obliquely forward from bottom to top, the lower end of the front inclined pipe is detachably connected to the junction of the first outer side pipe and the second outer side pipe, and the upper end of the front inclined pipe is connected to the upper part of the front support frame.

According to some specific embodiments of the present disclosure, the middle part further includes a rear inclined pipe, the rear inclined pipe extends obliquely backward from bottom to top, the lower end of the rear inclined pipe is connected to the rear end of the second outer side pipe, and the upper part of the rear inclined pipe is jointly connected to an upper cross beam.

According to some specific embodiments of the present disclosure, the body further includes: a roll cage, wherein the roll cage is mounted at the middle part, and an operator cabin is defined jointly by the roll cage and the middle part; and the roll cage includes: a side fence, the side fence is connected to the rear inclined pipe, and the side fence is connected to the front inclined pipe to form a closed loop.

According to some specific embodiments of the present disclosure, the side fence includes:

a front upper pipe segment, wherein the front upper pipe segment extends to the top and front of the operator cabin, and the lower end of the front upper pipe segment is connected to the upper end of the front inclined pipe;

a rear pipe segment, wherein the rear pipe segment extends to the rear of the operator cabin, the upper end of the rear pipe segment is connected to the rear end of the front upper pipe segment, and the lower part of the rear pipe segment is connected to the rear inclined pipe; and a lower pipe segment, wherein the lower pipe segment extends to the bottom of the operator cabin, the front end of the lower pipe segment is detachably connected to the lower end of the front inclined pipe, and the rear end of the lower pipe segment is detachably connected to the lower end of the rear pipe segment.

According to some specific embodiments of the present disclosure, the rear part includes two lower side beams, the two lower side beams are connected to a rear of the middle part, and the distance between the two lower side beams decreases from front to back; and the front ends of the two lower side beams are connected to a third outer side pipe, and the third outer side pipe is provided with a front mounting member for mounting the power train.

According to some specific embodiments of the present disclosure, an intermediate cross beam is connected between the two lower side beams, and the intermediate cross beam is provided with a rear mounting member for mounting the power train, wherein a detachable differential bracket is connected between the two lower side beams, wherein a rear bottom plate is connected between the two lower side beams; and wherein the power train includes an engine, and there are two rear mounting members provided at an interval.

According to some specific embodiments of the present disclosure, the rear bottom plate is configured with two longitudinal reinforcing ribs and a plurality of transverse reinforcing ribs, the distance between the two longitudinal reinforcing ribs gradually increases from back to front, the plurality of transverse reinforcing ribs are provided at intervals in the front-rear direction, both ends of each of the transverse reinforcing rib are connected to the two longitudinal reinforcing ribs, respectively, the transverse reinforcing ribs are provided with differential mounting holes, and the longitudinal reinforcing ribs are provided with pits.

According to some specific embodiments of the present disclosure, the rear part further includes two upper side beams, the two upper side beams are connected to the rear of the middle part, the two upper side beams are located above the two lower side beams, and the distance between the two upper side beams decreases from front to back.

A detachable middle horizontal bar is provided between the two upper side beams, the middle horizontal bar is provided with a top mounting member for mounting the power train, the power train comprises an engine, and the top mounting member is used for fixing a cylinder head of the engine.

According to some specific embodiments of the present disclosure, a rear upper cross beam and a detachable transverse bracket are provided between the two upper side beams, both ends of the rear upper cross beam are connected to the rear ends of the two upper side beams, respectively, the transverse bracket is located in front of the rear upper cross beam, and the rear upper cross beam is provided with a muffler upper mounting plate.

According to some specific embodiments of the present disclosure, a left rear mounting vertical beam of a rear rocker arm is connected between the upper side beam and the lower side beam on one side, and the lower side beam is provided with a left front mounting plate of a rear rocker arm which is located in front of the left rear mounting vertical beam of the rear rocker arm and disconnected from the upper side beam.

A right rear mounting vertical beam of the rear rocker arm is connected between the upper side beam and the lower side beam on the other side, and the lower side beam is provided with a right front mounting plate of the rear rocker arm which is located in front of the right rear mounting vertical beam of the rear rocker arm and disconnected from the upper side beam.

According to some specific embodiments of the present disclosure, the body further includes:

a left rear suspension, wherein the left rear suspension includes a left wheel axle support, an upper left rocker arm, a lower left rocker arm and a left shock absorber, the upper left rocker arm, the lower left rocker arm and the left shock absorber are all connected to the left wheel axle support, the front end of the upper left rocker arm and the front end of the lower left rocker arm are mounted on the left front mounting plate of the rear rocker arm, the rear end of the upper left rocker arm and the rear end of the lower left rocker arm are mounted on the left rear mounting vertical beam of the rear rocker arm, and the upper end of the left shock absorber is mounted on the corresponding upper side beam; and a right rear suspension, wherein the right rear suspension includes a right wheel axle support, an upper right rocker arm, a lower right rocker arm and a right shock absorber, the upper right rocker arm, the lower right rocker arm and the right shock absorber are all connected to the right wheel axle support, the front end of the upper right rocker arm and the front end of the lower right rocker arm are mounted on the right front mounting plate of the rear rocker arm, the rear end of the upper right rocker arm and the rear end of the lower right rocker arm are mounted on the right rear mounting vertical beam of the rear rocker arm, and the upper end of the right shock absorber is mounted on the corresponding upper side beam.

According to some specific embodiments of the present disclosure, the lower end of the left rear mounting vertical beam of the rear rocker arm is provided with a left mounting seat of a rear stabilizer bar, the lower end of the right rear mounting vertical beam of the rear rocker arm is provided with a right mounting seat of a rear stabilizer bar, a rear stabilizer bar is connected between the left mounting seat of the rear stabilizer bar and the right mounting seat of the rear stabilizer bar, and both ends of the rear stabilizer bar are connected to the lower left rocker arm and the lower right rocker arm through connecting rods, respectively.

According to some specific embodiments of the present disclosure, the lower end of the left rear mounting vertical beam of the rear rocker arm is provided with a left mounting plate, the lower end of the right rear mounting vertical beam of the rear rocker arm is provided with a right mounting plate, and a towing mounting seat is provided between the left mounting plate and the right mounting plate.

The left mounting plate is provided with a left avoidance hole, the right mounting plate is provided with a right avoidance hole, and the rear stabilizer bar passes through the left avoidance hole and the right avoidance hole.

A muffler lower mounting plate is further provided between the left mounting plate and the right mounting plate, and the muffler lower mounting plate is located above the towing mounting seat.

According to some specific embodiments of the present disclosure, the lower mounting bracket includes a rocker arm bracket and a bottom sheet metal; the middle part further includes a front support frame, the rocker arm bracket is connected to the front end of the bottom sheet metal and the front end of the front support frame; and the lower end of the upper support frame is detachably mounted on the bottom sheet metal, and the rear end of the upper support frame is detachably mounted on the front support frame.

According to the embodiment of a second aspect of the present disclosure, an all-terrain vehicle is provided, including: a body of an all-terrain vehicle according to the embodiment of the first aspect of the present disclosure; a hybrid power train, wherein the hybrid power train is provided in a power compartment, the hybrid power train comprises an engine, a CVT (Continuously Variable Transmission) transmission system and a generator, the CVT transmission system is provided on one side of the engine and provided in the front-rear direction, the generator is provided on the other side of the engine, and a motor shaft of the generator is connected to a crankshaft of the engine through splines.

According to the embodiment of the third aspect of the present disclosure, an all-terrain vehicle is provided, including: a body of an all-terrain vehicle according to the embodiment of the first aspect of the present disclosure; an extended-range power train, wherein the extended-range power train is provided in a power compartment, the extended-range power train comprises an engine, a generator and a motor, the generator is provided in front of the engine, a motor shaft of the generator is connected to a crankshaft of the engine through splines, and the motor is provided behind the engine.

The all-terrain vehicle according to the embodiment of the present disclosure has the advantages of high space utilization rate, convenient disassembly and assembly, and easy replacement of the front shape by using the body of the all-terrain vehicle according to the embodiment of the first aspect of the present disclosure.

Additional aspects and advantages of the present disclosure will be set forth in part in the following description, and will become apparent from the following description in part, or may be learned by practice of the present disclosure.

BRIEF DESCRIPTION OF THE DRAWINGS

The above and/or additional aspects and advantages of the present disclosure will become apparent and understandable from the description of embodiments in conjunction with the following drawings, in which.

Figure 1:
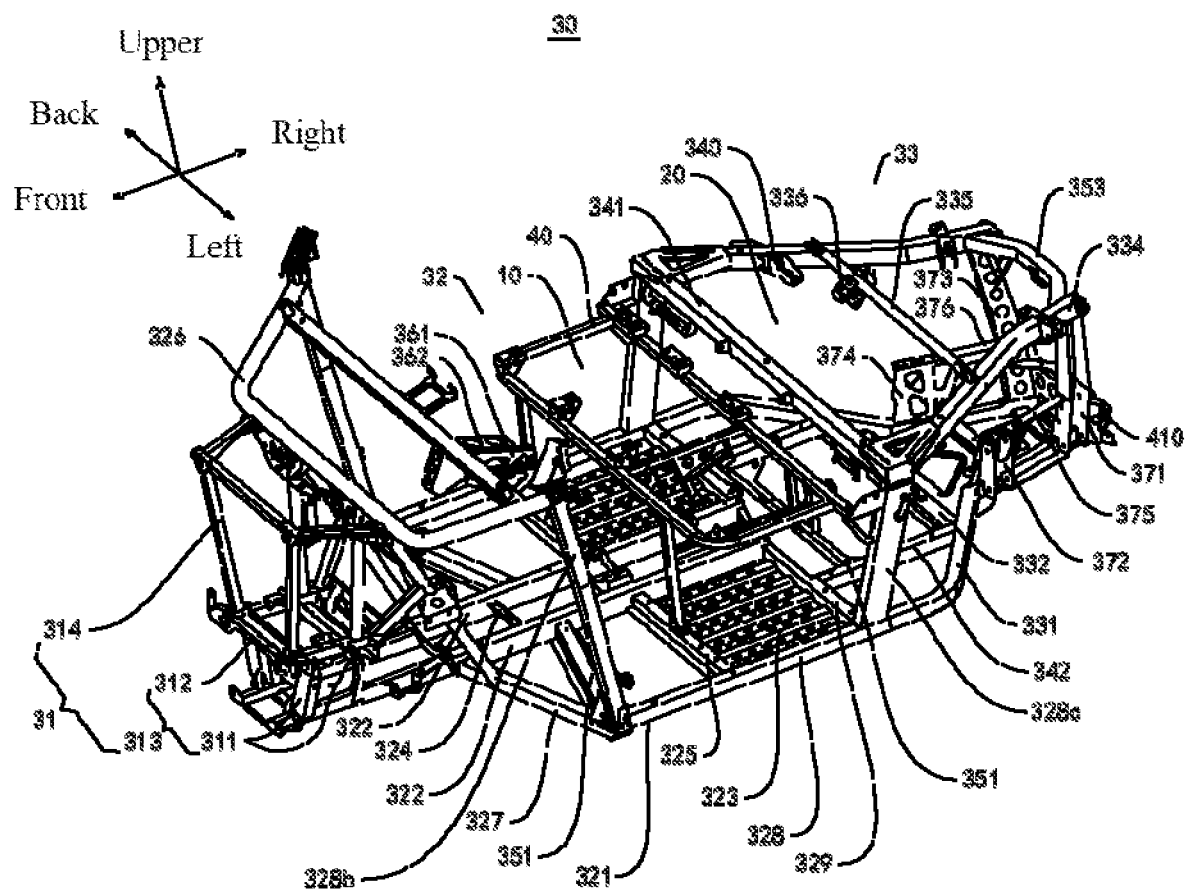
FIG. 1 and FIG. 2 are schematic diagrams of different angles of a vehicle frame of a body of an all-terrain vehicle according to an embodiment of the present disclosure.

REFERENCE NUMBERS operator cabin 10; power compartment 20; vehicle frame 30; front portion 31; rocker arm bracket 311; bottom sheet metal 312; lower mounting frame 313; upper support frame 314;
middle part 32; outer side pipe 321; inner longitudinal beam 322; bottom plate 323; support bar 324; inner cross beam 325; front support frame 326; inner inclined beam 351;
first outer side pipe 327; second outer side pipe 328; front inclined pipe 328b; rear inclined pipe 328c;
third outer side pipe 329;
rear portion 33; lower side beam 331; intermediate cross beam 332; rear mounting member 333; upper side beam 334; middle horizontal bar 335; top mounting member 336; rear bottom plate 339; longitudinal reinforcing rib 3391; transverse reinforcing rib 3392; differential mounting hole 3393; pit 3394; controller bracket 340; upper cross beam 341; rear lower longitudinal beam 342; front mounting member 351; differential bracket 352; rear upper cross beam 353; transverse bracket 354; muffler upper mounting plate 355;
steering wheel bracket 361; shift bracket 362;
left rear mounting vertical beam of a rear rocker arm 371; left front mounting plate of a rear rocker arm 372; right rear mounting vertical beam of a rear rocker arm 373; front right mounting plate of a rear rocker arm 374; left reinforcing plate 375; right reinforcing plate 376;
roll cage 60; side fence 610; front upper pipe segment 611; rear pipe segment 612; lower pipe segment 613; horizontal segment 6131; inclined segment 6132; front bracket 614; connecting elbow 615; front top horizontal bar 621; rear top horizontal bar 622; rear back horizontal bar 623; rear bottom horizontal bar 624;
left rear suspension 380; left wheel axle support 381; upper left rocker arm 382; lower left rocker arm 383; left shock absorber 384;
right rear suspension 390;
left mounting seat of a rear stabilizer bar 410; right mounting seat of a rear stabilizer bar 420; rear stabilizer bar 430; connecting rod 440; left mounting plate 450; left avoidance hole 451; right mounting plate 460; right avoidance hole 461; towing mounting seat 470; muffler lower mounting plate 480;
seat frame 40; driver seat 501; passenger seat 502; intermediate seat 503; seat cushion 51; backrest 52; buckle position 510; buckle bracket 520; inverted U-shaped bracket 530; driver seat bump 540; hanger 550; passenger seat bump 560;

power train 200; engine 211; rear transmission shaft 212; differential 213; CVT transmission system 214; front engine leg 215; rear engine leg 216; generator 217; intake manifold 218; cylinder head 219; exhaust port 2191;
power output system 221; motor 222; gearbox 223; gearbox 231;
rear towing apparatus 300; muffler 400.

DETAILED DESCRIPTION OF THE EMBODIMENTS

Embodiments of the present disclosure are described in detail hereinafter, the embodiments described with reference to the drawings are exemplary, and the embodiments of the present disclosure are described in detail hereinafter.

An all-terrain vehicle according to an embodiment of the present disclosure is described with reference to FIGS. 1-15 hereinafter. The all-terrain vehicle is a side-by-side all-terrain vehicle with side-by-side seats.

Figure 5:
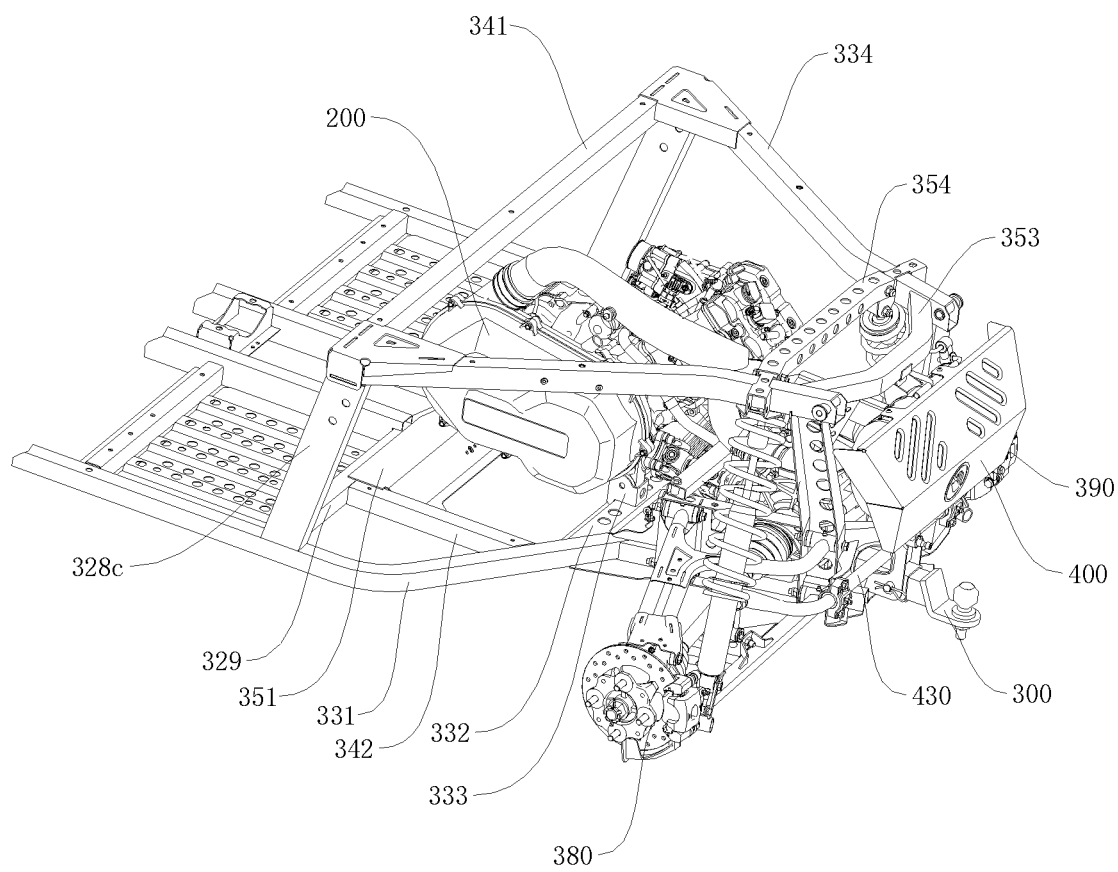
FIG. 5 is a schematic layout diagram of a power train of a body of an all-terrain vehicle according to an embodiment of the present disclosure.
Figure 6:
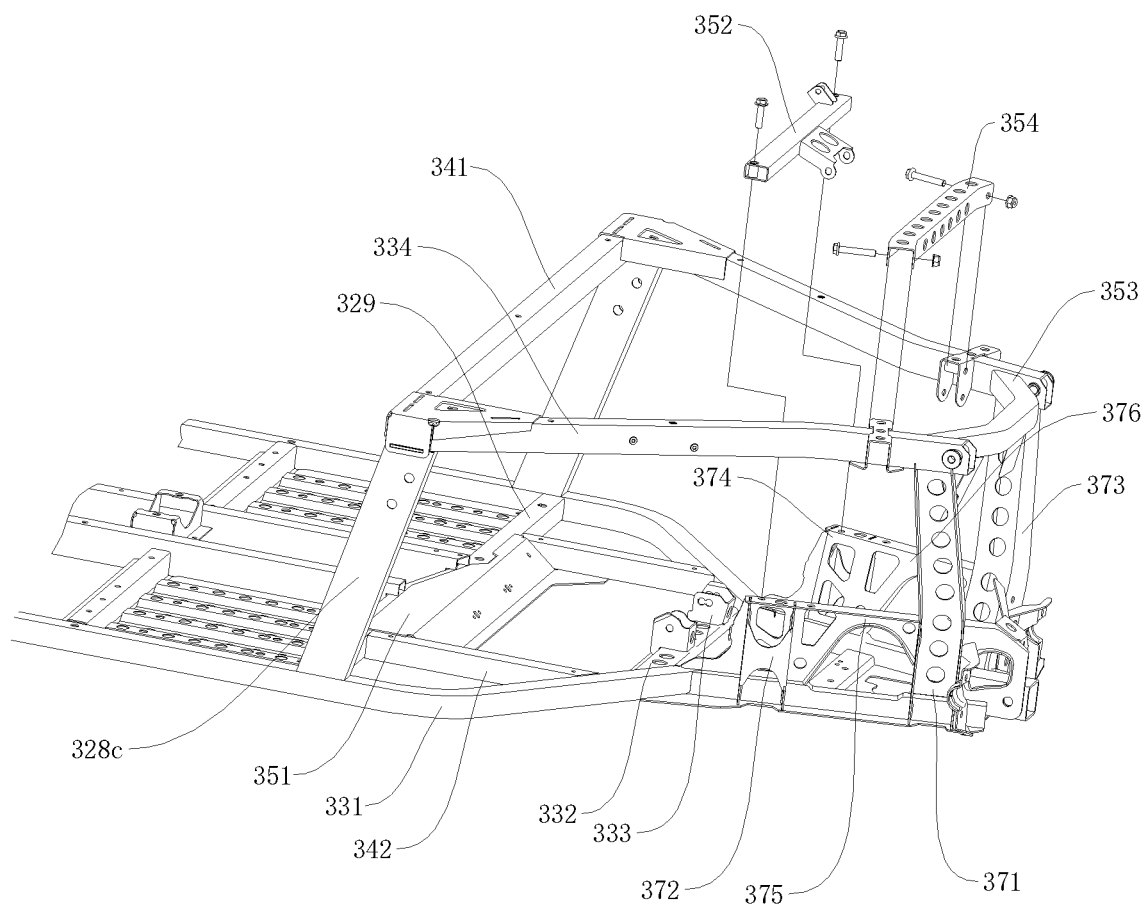
FIG. 6 is an exploded view of a rear part of a vehicle frame of a body of an all-terrain vehicle according to an embodiment of the present disclosure.
Figure 7:
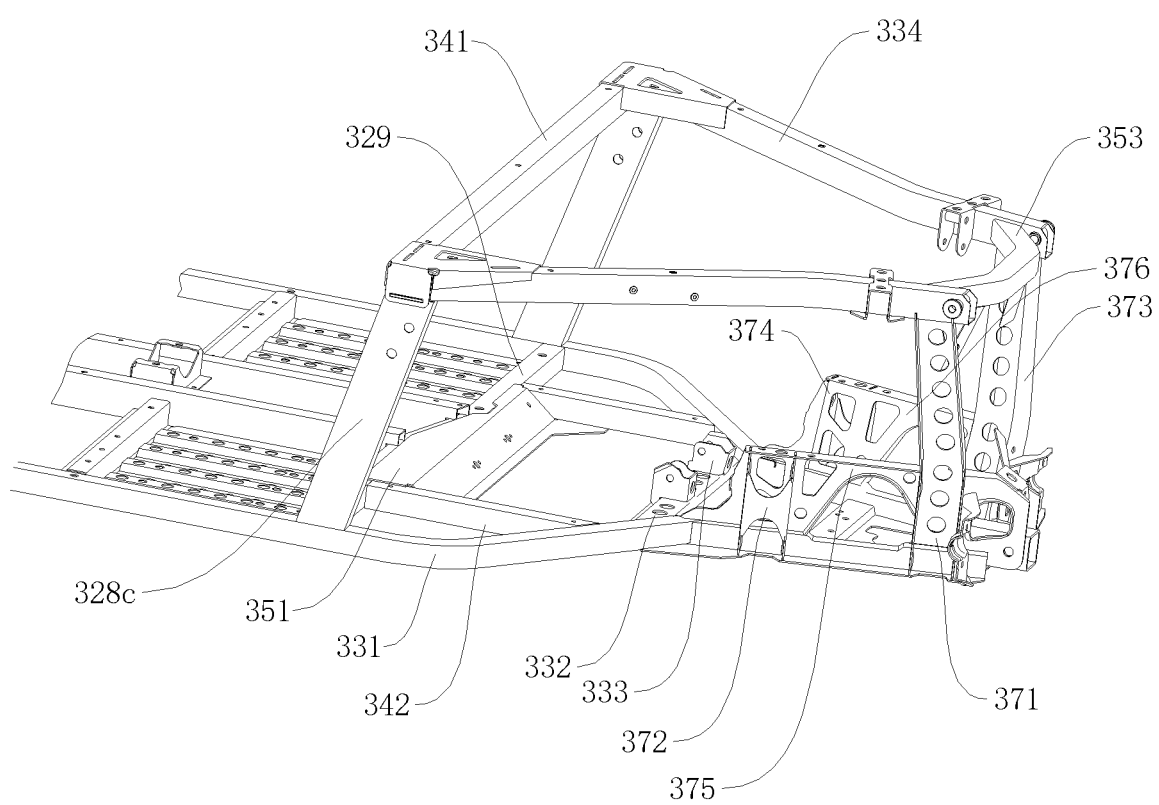
FIG. 7 and FIG. 8 are schematic diagrams of different angles of a rear part of a vehicle frame of a body of an all-terrain vehicle according to an embodiment of the present disclosure.

As shown in FIG. 5, a side-by-side all-terrain vehicle according to an embodiment of the present disclosure may comprise a body and a power train 200, wherein the power train 200 may be a hybrid, extended-range or fuel-type power train. The power train 200 and the layout thereof will be described in detail in the following embodiments of the present disclosure.

Of course, in some embodiments of the present disclosure, the side-by-side all-terrain vehicle may further comprise a left rear suspension 380, a right rear suspension 390, a rear stabilizer bar 430, a rear towing apparatus 300, a muffler 400, and the like.

Figure 2:
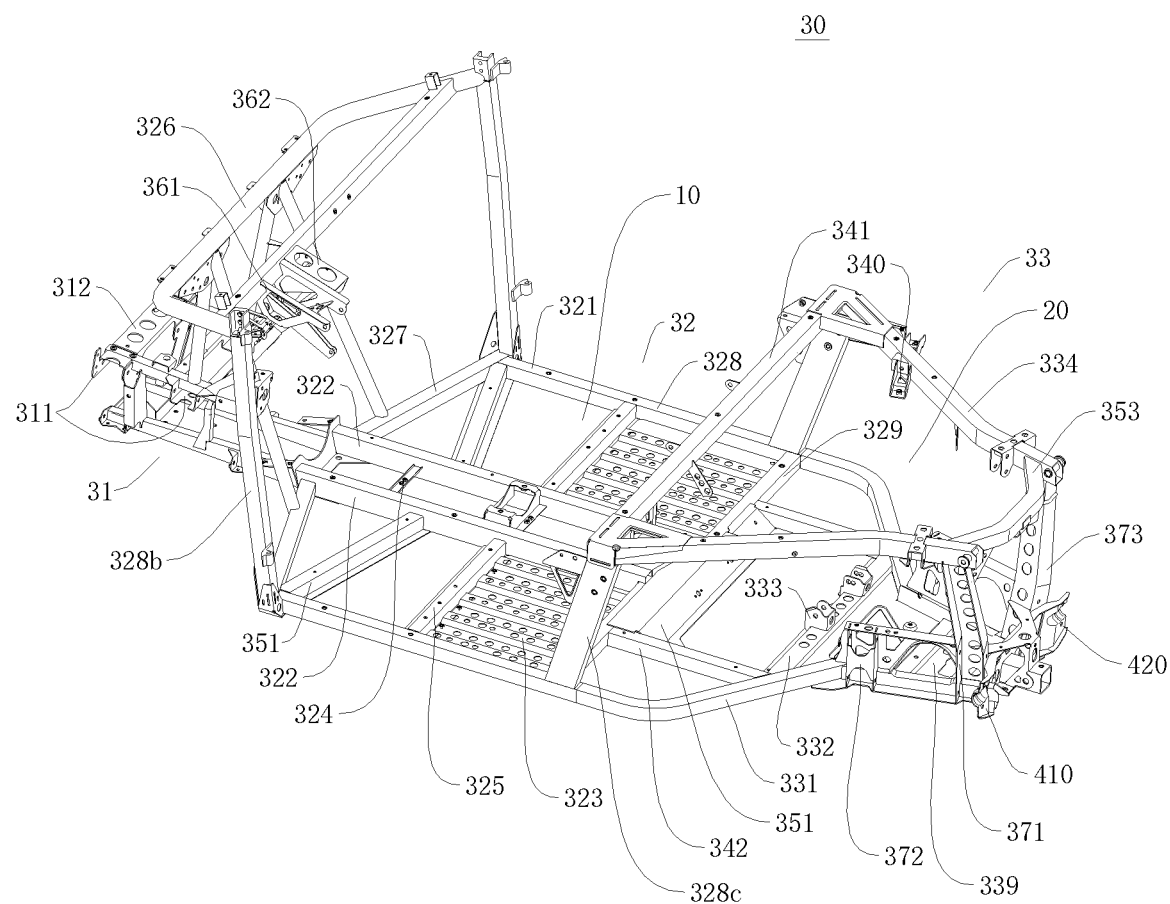
Figure 3:
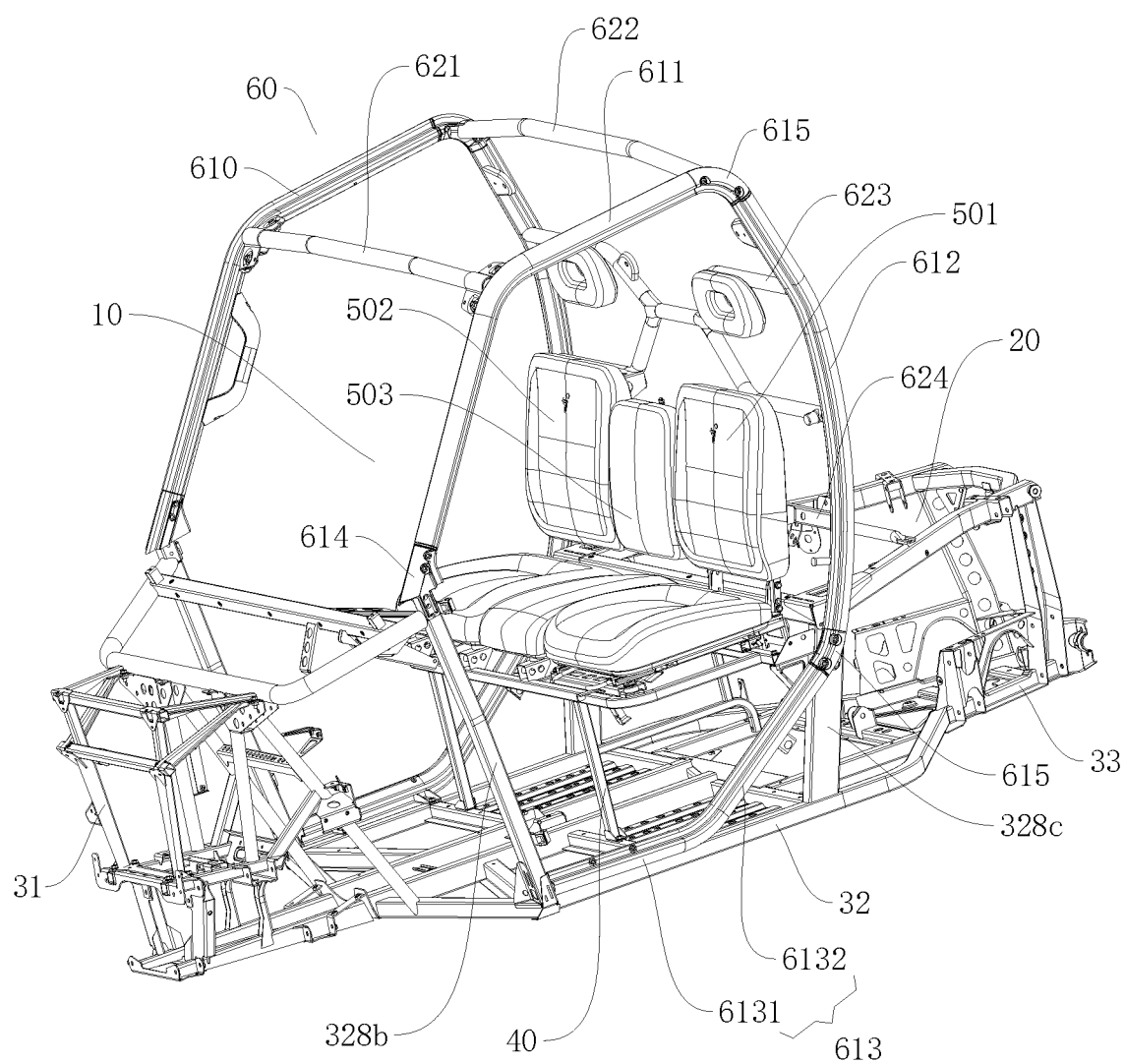
FIG. 3 and FIG. 4 are schematic diagrams of different angles of a vehicle frame, a roll cage and a seat of a body of an all-terrain vehicle according to an embodiment of the present disclosure.

As shown in FIGS. 1-3, the body comprises an operator cabin 10 and a power compartment 20. The power compartment 20 is located behind the operator cabin 10, that is, the body is divided into two cabins at least in the front-rear direction, in which the cabin located on the front side is the operator cabin 10. The operator cabin 10 is used by a driver and passengers, and the driver can perform driving operations in the cabin. The power compartment 20 is located behind the operator cabin 10, and the power compartment 20 is used for placing and fixing the power train 200.

Therefore, by providing the power train 200 in the power compartment 20, the power train 200 can be isolated from the operator cabin 10, the working noise transmitted from the power train 200 to the operator cabin 10 can be reduced, and the driving comfort of the all-terrain vehicle can be improved.

The body comprises a vehicle frame 30 and a seat frame 40. The vehicle frame 30 comprises a front part 31, a middle part 32 and a rear part 33. The front part 31 is used to arrange a steering system, a front axle, a front suspension system and other structures. The middle part 32 forms a part of the operator cabin 10. The middle part 32 mainly forms the bottom structure of the operator cabin 10. The seat frame 40 is provided in the middle part 32 and located in the operator cabin 10. Seats (such as a driver seat 501, a passenger seat 502 and an intermediate seat 503) are fixedly mounted on the seat frame 40. The driver and passengers can sit on the corresponding seats. The rear portion 33 forms at least a part of the power compartment 20, that is, the rear portion 33 may constitute only a part of the power compartment 20 or the whole of the power compartment 20.

Further, the seat frame 40 can be detachably provided in the middle part 32, and the seat frame defines the mounting space for a plurality of components with the bottom of the middle part 32. The components can comprise power batteries or other components. There may be a plurality of mounting spaces. Different components or the same components can be placed in the plurality of mounting spaces, which can be selected according to actual needs. On the one hand, the seat frame 40 provided in this way can facilitate the mounting and fixation of components and can reasonably utilize the interior space of the operator cabin, and on the other hand, the seat frame can facilitate mounting and fixing components, and can make reasonable use of the internal space of the operator cabin 10, and on the other hand, can ensure the precision size of the seat frame 40 itself, facilitate the replacement and maintenance, and reduce the maintenance and replacement cost of an all-terrain vehicle.

For example, a power battery is provided between the seat frame 40 and the bottom of the middle part 32. In other words, the seat frame 40 and the middle part 32 of the vehicle frame 30 jointly define the mounting space for the power battery. The power battery provided in this way will not affect the arrangement of the seat and the seat frame 40. Moreover, the lower space of the seat frame 40 can be effectively utilized, which can improve the space utilization rate of the operator cabin 10. In addition, the use of the detachable seat frame 40 can greatly facilitate the assembly and disassembly of the power battery.

Figure 15:
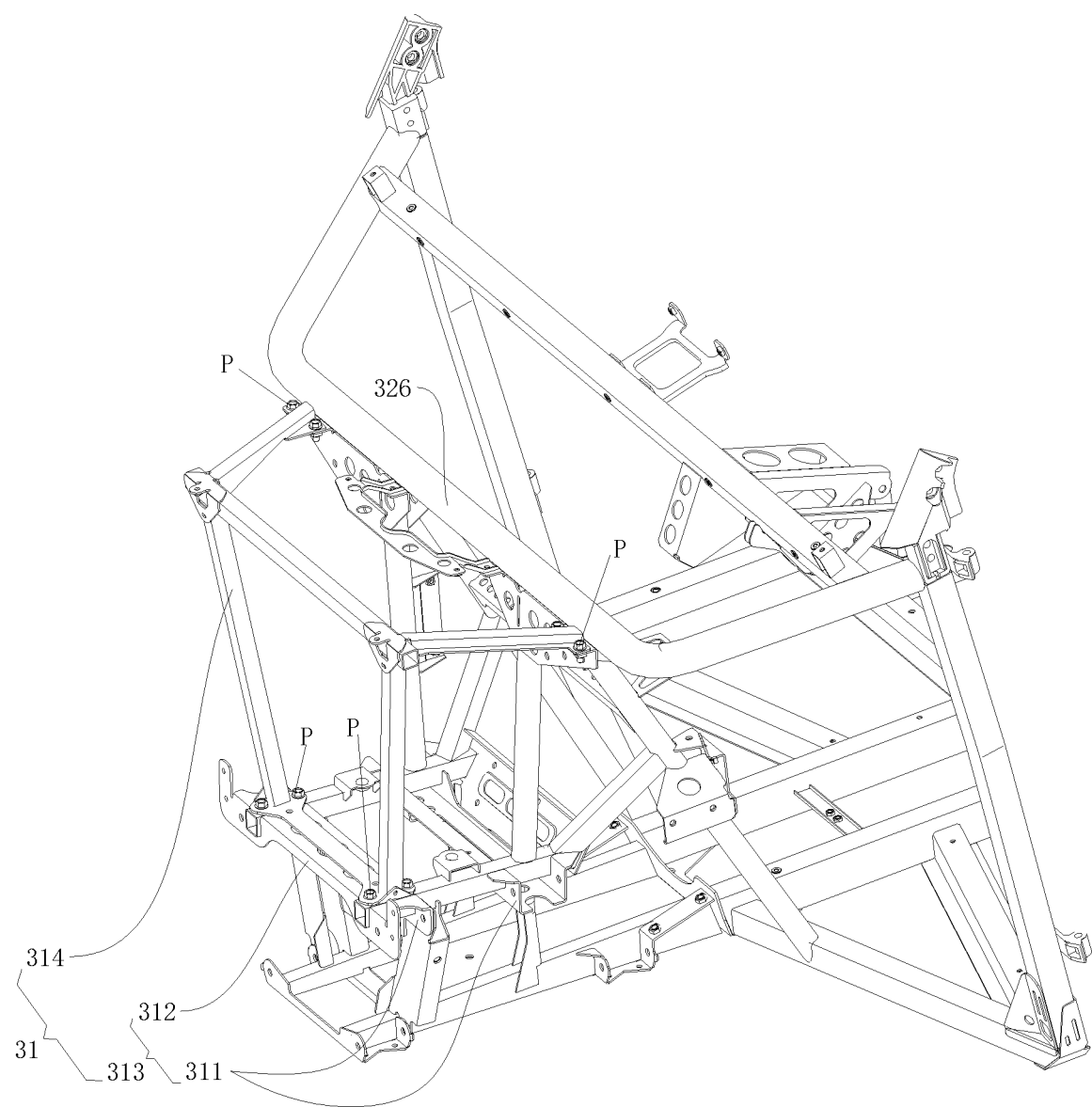
FIG. 15 is a structural schematic diagram of a front part of a vehicle frame of a body of an all-terrain vehicle according to an embodiment of the present disclosure.

In some embodiments of the present disclosure, as shown in FIGS. 1 and 15, the front part 31 comprises a lower mounting bracket 313 and an upper support frame 314. The upper support frame 314 is located above the lower mounting bracket 313, the lower mounting bracket 313 is connected to the middle part 32, and the upper support frame 314 is detachably connected to both the lower mounting bracket 313 and the middle part 32. Therefore, the front part 31 is provided with the lower mounting bracket 313 and the upper support frame 314, and the upper support frame 314 is a detachable component. By replacing the upper support frame 314, different vehicle heads (such as vehicle heads with different heights) can be changed and other components (such as a front cargo platform) can be added, so that the appearance of the whole vehicle can be conveniently changed.

More specifically, as shown in FIGS. 1 and 15, the lower mounting bracket 313 comprises a rocker arm bracket 311 and a bottom sheet metal 312. The rocker arm bracket 311 is connected to the front end of the bottom sheet metal 312 and the front end of the front support frame 326. The rocker arm bracket 311 is used to mount the inner ends of the upper rocker arm and the lower rocker arm in the front (not shown in the figure). The rocker arm bracket 311 can simultaneously mount the inner ends of two upper rocker arms and the inner ends of two lower rocker arms, which can reduce the mounting difficulty of the upper rocker arm and the lower rocker arm. The rocker arm bracket is simple in structure and light in weight. The bottom sheet metal 312 can be used to support and fix the differential of the front axle, which can ensure the mounting reliability of the differential.

The lower end of the upper support frame 314 is detachably mounted to the bottom sheet metal 312, and the rear end of the upper support frame 314 is detachably mounted to the front support frame 326. For example, the upper support frame 314 and the bottom sheet metal 312 are mounted by two mounting points P. The upper support frame 314 and the front support frame 326 are mounted by two mounting points P. Two vertical beams at the front part of the upper support frame 314 are mounted to the bottom sheet metal 312 by bolts and nuts (for example, a front set of bolts and nuts and a back set of bolts and nuts are used for each mounting point P), respectively. Two longitudinal beams at the upper part of the upper support frame 314 are mounted to the front support frame 326 by bolts and nuts with the front support frame 326 (for example, a left set of bolts and nuts and a right set of bolts and nuts are used for each mounting point P), respectively.

The middle part 32, the rear part 33 and the front part 31 will be described in detail hereinafter, respectively.

According to a specific embodiment of the present disclosure, as shown in FIGS. 1 and 2, the middle part 32 comprises an outer side pipe 321, an inner longitudinal beam 322 and a bottom plate 323. The inner longitudinal beam 322 is located inside the outer side pipe 321, the bottom plate 323 is connected between the outer side pipe 321 and the inner longitudinal beam 322, and the bottom plate 323 forms the bottom of the mounting space. It can be understood that the outer side pipe 321 defines the bottom outer edge of the middle part 32. The inner longitudinal beam 322 extends in the front-rear direction. Both ends of the inner longitudinal beam 322 are connected to the outer side pipe 321, which serves to strengthen the structural strength of the middle part 32 therein. The bottom plate 323 can serve as a support. The middle part 32 provided in this way can ensure the stability of the bottom structure of the operator cabin 10.

Further, there are a plurality of outer side pipes 321. The plurality of outer side pipes 321 are connected in sequence. The outer side pipe 321 located on the front side is connected to the front end of the inner longitudinal beam 322, and the outer side pipe 321 located on the rear side is connected to the rear end of the inner longitudinal beam 322. The specific shape of the bottom part of the operator cabin 10 can be reasonably defined by using a plurality of outer side pipes 321, so that the structure of the middle part 32 can be reasonably arranged.

Specifically, the plurality of outer side pipes 321 comprise a first outer side pipe 327, a second outer side pipe 328 and a third outer side pipe 329. There are two first outer side pipes 327 and two second outer side pipes 328. Moreover, two first outer side pipes 327 and two second outer side pipes 328 are distributed outside the two inner longitudinal beams 322. The first outer side pipe 327 is obliquely connected between the front end of the inner longitudinal beam 322 and the second outer side pipe 328. The third outer pipe 329 is connected to the rear ends of the two inner longitudinal beams 322, and both ends of the third outer pipe 329 are connected to the rear ends of the two second outer pipes 328, respectively. Therefore, the bottom of the middle part 32 can be defined by selecting three types of outer side pipes 321. Moreover, the plurality of outer side pipes 321 provided in this way have reasonable overall layout and high structural strength, which can effectively separate the operator cabin 10 from the power compartment 20. The two connected outer side pipes 321 can be fixed by welding.

As shown in FIGS. 1 and 2, the middle part 32 further comprises a front inclined pipe 328*b* and a front support frame 326. The front support frame 326 is connected to the first outer side pipe 327. The front inclined pipe 328*b* extends obliquely from bottom to top. The lower end of the front inclined pipe 328*b* is detachably connected to the junction of the first outer side pipe 327 and the second outer side pipe 328, and the upper end of the front inclined pipe 328*b* is connected to the upper part of the front support frame 326. The front inclined pipe 328*b* is provided, which can effectively strengthen the structural strength of the middle part 32. Moreover, the front inclined pipe 328*b* is obliquely provided, which can effectively protect the driver and passengers in the operator cabin 10 and can improve the riding safety of the driver and passengers.

As shown in FIGS. 1 and 2, the middle part 32 further comprises two rear inclined pipes 328*c*. The two rear inclined pipes 328*c* extend obliquely backward from bottom to top. The lower ends of the two rear inclined pipes 328*c* are connected to the rear ends of the two second outer side pipes 328, respectively. The upper parts of the two rear inclined pipes 328*c* are jointly connected to an upper cross beam 341. Therefore, the rear inclined pipe 328*c* is obliquely provided backward. The rear inclined pipe 328*c* is provided, which can effectively strengthen the structural strength of the middle part 32, effectively protect the driver and passengers in the operator cabin 10, and improve the riding safety of the driver and passengers. In addition, the upper cross beam 341 can separate the operator cabin 10 from the power compartment 20, which can ensure the safety of the driver and passengers. The upper cross member 341 can also serve to mount the seat frame 40.

The first outer side pipe 327, the second outer side pipe 328, the third outer side pipe 329, the front inclined pipe 328*b* and the rear inclined pipe 328*c* are separated from each other, and each of them has a rectangular cross section. With this arrangement, the structural stability of the frame 30 can be improved.

In some embodiments of the present disclosure, as shown in FIGS. 1 and 2, the middle part 32 further comprises a steering wheel bracket 361 and a shift bracket 362. The steering wheel bracket 361 is connected to the front support frame 326. The shift bracket 362 and the steering wheel bracket 361 are arranged on the same side in the left-right direction, for example, on the left side. The shift bracket 362 and the steering wheel bracket 361 are welded together, thereby increasing the strength of the shift bracket 362 and the rotating shaft and preventing the shift mechanism from shaking.

In some embodiments of the present disclosure, as shown in FIGS. 1 and 2, a number of the inner longitudinal beam 322 is two. The two inner longitudinal beams 322 are provided transversely opposite to each other. The two inner longitudinal beams 322 define the mounting space of the transmission shaft of the all-terrain vehicle. That is, the space between the two inner longitudinal beams 322 is the mounting space of the transmission shaft, so that the two inner longitudinal beams 322 can improve the structural strength of the bottom of the vehicle frame 30, and at the same time, isolate the transmission shaft from other components, thus ensuring the mounting reliability of the transmission shaft.

Preferably, as shown in FIGS. 1 and 2, a support bar 324 is connected between the two inner longitudinal beams 322. The support bar 324 is used to support the transmission shaft. The transmission shaft can be provided with bearings and bearing seats. The support bar 324 is used to support and fix the bearing seats, and the left and right ends thereof can be provided with mounting holes for fixing the bearing seats.

The bottom of the middle part 32 is provided with a groove in which a power battery or other components can be provided. The groove is provided, which can facilitate mounting and fixing the power battery or other components. The groove can accommodate the bottom of the power battery or other components, and can also provide some mounting points for the power battery or other components, so as to better ensure the mounting reliability of the power battery or other components.

Specifically, as shown in FIGS. 1 and 2, the middle part 32 may further comprise an inner cross beam 325. The inner cross beam 325 is connected between the inner longitudinal beam 322 and the outer side pipe 321. The bottom plate 320 is connected between the second outer side pipe 328, the third outer side pipe 329, the inner longitudinal beam 322 and the inner cross beam 325. A part of the second outer side pipe 328, a part of the third outer side pipe 329, the inner cross beam 325, and a part of the inner longitudinal beam 322 form a groove on the bottom plate 323. The groove is a part of the mounting space. The inner cross beam 325 is provided, which can effectively limit the degree of freedom of the components, and can ensure the reliability of placing the components under the seat frame 40.

Further, the all-terrain vehicle may further comprise a storage box. The storage box is provided inside the seat frame 40 and located above the power battery. That is, storage boxes are provided below the seat and above the power battery. The storage box provided in this way can reasonably utilize the space at the seat frame 40, and can improve the space utilization rate of the operator cabin 10. Moreover, the storage box provided in this way can be convenient for the driver and passengers to fetch and place articles.

In order to further strengthen the structural strength of the bottom of the middle part 32, the middle part 32 further comprises an inner inclined beam 351. The inner inclined beam 351 is connected between the inner longitudinal beam 322 and the second outer side pipe 328 and located in front of the inner cross beam 325. The inner inclined beam 351 extends obliquely forward in the direction from the inner longitudinal beam 322 to the second outer side pipe 328.

Figure 4:
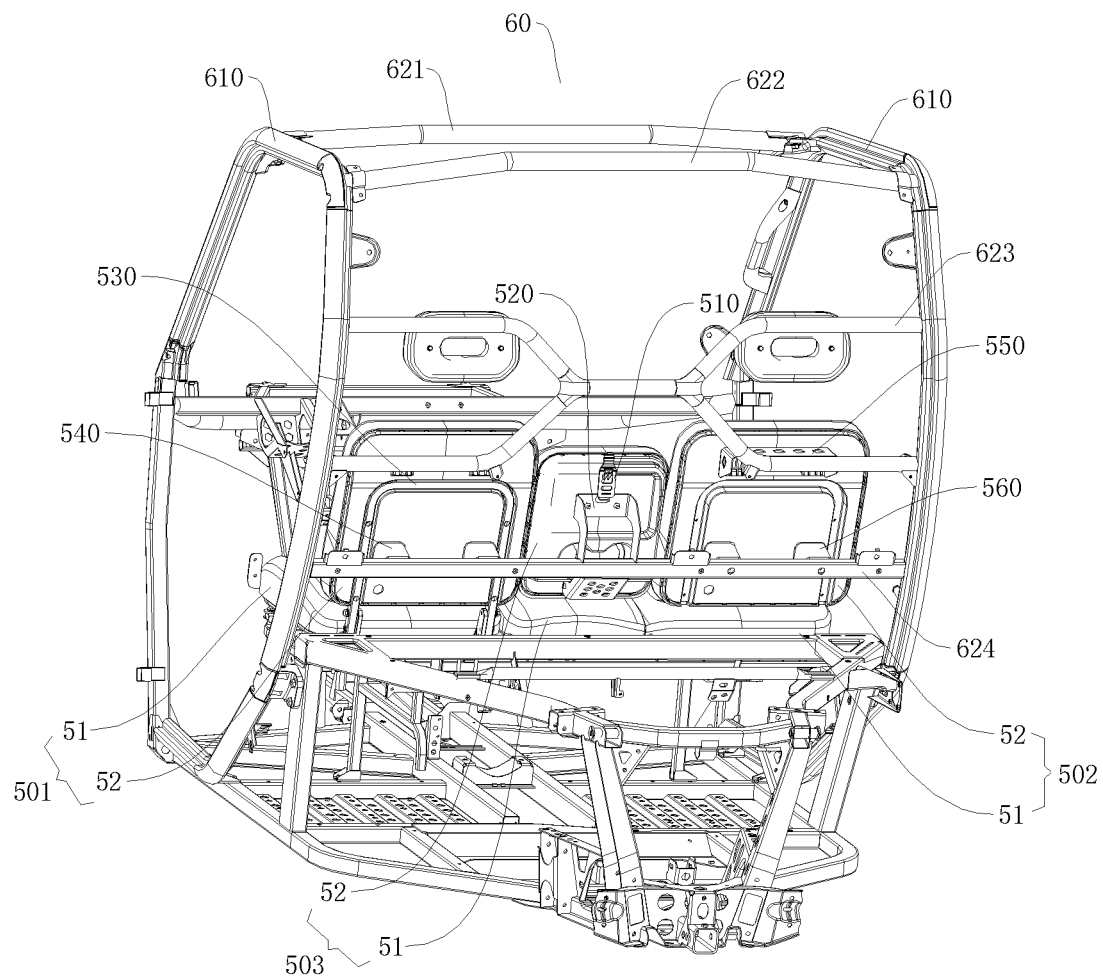

In some specific embodiments of the present disclosure, as shown in FIGS. 3 and 4, the body further comprises a roll cage 60. The roll cage 60 is mounted at the middle part 32. The roll cage 60 and the middle part 32 jointly define the operator cabin 10, thereby improving the safety of people in the operator cabin 10 and indirectly improving the off-road capability of the all-terrain vehicle.

Specifically, as shown in FIG. 3, the roll cage 60 comprises a side fence 610. The side fence 610 is connected to the rear inclined pipe 328c. The side fence 610 is connected to the front inclined pipe 328b to form a closed loop, thereby further enhancing the structural strength and further improving the safety.

More specifically, the side fence 610 comprises a front upper pipe segment 611, a rear pipe segment 612 and a lower pipe segment 613.

The front upper pipe segment 611 extends to the top and front of the operator cabin 10, and the lower end of the front upper pipe segment 611 is connected to the upper end of the front inclined pipe 328b. The rear pipe segment 612 extends to the rear of the operator cabin 10, the upper end of the rear pipe segment 612 is connected to the rear end of the front upper segment 611, and the lower part of the rear pipe segment 612 is connected to the rear inclined pipe 328c. The lower pipe segment 613 extends to the bottom of the operator cabin 10, the front end of the lower pipe segment 613 is detachably connected to the lower end of the front inclined pipe 328b, and the rear end of the lower pipe segment 613 is detachably connected to the lower end of the rear pipe segment 612.

Therefore, the front upper pipe segment 611, the rear pipe segment 612, the lower pipe segment 613 and the front inclined pipe 328b jointly construct the overall shape of the operator cabin 10. Since the lower pipe segment 613 is exposed and the lower pipe segment 613 is detachable in the whole vehicle, it is convenient for the lower pipe segment 613 to be individually painted, thus diversifying the appearance of the all-terrain vehicle. In addition, the lower pipe segment 613 is detachable and is also convenient for packaging and transportation.

The front pipe segment 611 is connected to the rear pipe segment 612 and the rear pipe segment 612 is connected to the lower pipe segment 613 through the connecting elbow 615, so that the overall shape of the side fence 610 can be defined, the bending structure can be formed conveniently, and the manufacturing difficulty of the front upper pipe segment 611, the rear pipe segment 612 and the lower pipe segment 613 can be reduced.

As shown in FIG. 3, the lower pipe segment 613 comprises a horizontal segment 6131 and an inclined segment 6132 which are connected in sequence. The horizontal segment 6131 and the inclined segment 6132 are integrally formed. The front end of the horizontal segment 6131 is detachably connected to the lower end of the front inclined pipe 328b. The inclined segment 6132 extends obliquely backward and upward from the horizontal segment 6131, and the rear end of the inclined segment 6132 is connected to the lower end of the rear inclined pipe 328c. In this way, the inclined section 6132 is provided, which not only can improve the overall structural strength, but also better protect people in the operator cabin 10.

In order to further improve the reliability of the lower pipe segment 613, the lower pipe segment 613 is further detachably connected to the outer side pipe 321. Specifically, the horizontal segment 6131 of the lower pipe segment 613 is detachably connected to the second outer side pipe 328. As shown in FIG. 3, the horizontal segment 613 is mounted on the second outer side pipe 328 by two bolts. The two bolts are provided at an interval along the length direction of the horizontal segment 613.

Furthermore, as shown in FIG. 3, the side fence 610 further comprises a front bracket 614. The lower end of the front upper pipe segment 611 is connected to the upper end of the front inclined pipe 328b through the front bracket 614. The front bracket 614 is detachably connected to both the front upper pipe segment 611 and the front inclined pipe 328b, so that the front bracket 614 can be painted separately, thereby diversifying the appearance of the all-terrain vehicle. In addition, the front bracket 614 is detachable and is also convenient for packaging and transportation.

In some embodiments of the present disclosure, as shown in FIG. 3, the roll cage 60 further comprises a plurality of horizontal bars. Two side fences 610 are distributed on both sides (i.e., the left and right sides) of the operator cabin 10, and the plurality of horizontal bars are connected between the two side fences 610.

Specifically, the plurality of horizontal bars comprise a front top horizontal bar 621, a rear top horizontal bar 622, a rear back horizontal bar 623 and a rear bottom horizontal bar 624. The front top horizontal bar 621 and the rear top horizontal bar 622 are located on the top of the operator cabin 10, the front top horizontal bar 621 is located in front of the rear top horizontal bar 622, the rear back horizontal bar 623 and the rear bottom horizontal bar 624 are located behind the operator cabin 10, and the rear bottom horizontal bar 624 is located below the rear back horizontal bar 623. Therefore, the whole frame of the roll cage 60 is constructed, which has good anti-roll ability. In addition, a stable mounting framework is provided for the ceiling.

In order to increase the bearing capacity and area of the rear back horizontal bar 623, the rear back horizontal bar 623 can be constructed like an X-shaped structure and horizontally provided in the left-right direction.

In some specific examples of the present disclosure, as shown in FIGS. 3 and 4, the body further comprises a seat. The seat comprises a seat cushion 51 and a backrest 52. The seat cushion 51 is mounted on the seat frame 40, and the backrest 52 is connected to the rear bottom horizontal bar 624, thereby increasing the bearing capacity of the backrest 52 and improving the comfort and safety of people.

Specifically, the seat can be detachably mounted on the seat frame 40. It is convenient to mount and disassemble the seat provided in this way, so that the seat can be conveniently replaced and maintained. The seat comprises a seat cushion 51 and a backrest 52. The seat cushion 51 is detachably mounted on the seat frame 40. The backrest 52 is detachably mounted on the seat cushion 51. Therefore, the seat cushion 51 and the backrest 52 are separated, so that the seat cushion 51 and the backrest 52 can be manufactured separately, and the angle of the backrest 52 can be conveniently adjusted.

The seat may comprise a driver seat 501, a passenger seat 502 and an intermediate seat 503. The intermediate seat 503 is located between the driver seat 501 and the passenger seat 502.

The mounting structure of each seat will be described in detail hereinafter.

As shown in FIG. 4, with respect to the intermediate seat 503, the backrest 52 of the intermediate seat 503 can be turned over relative to the seat cushion 51. The backrest 52 of the intermediate seat 503 is provided with a buckle position 510. The rear bottom horizontal bar 624 is provided with a buckle bracket 520 for buckling with the buckle position 510. In this way, when a passenger normally sits in the intermediate seat 503, the backrest 52 can be turned over upwards, and the buckle bracket 520 is buckled with the buckle position 510 to fix the position of the backrest 52. In some special cases, the buckle position 510 and the buckle bracket 520 can be unlocked, so that the backrest 52 can be turned over and used as a shelf or a hand pillow.

As shown in FIG. 4, with respect to the driver seat 501, the seat frame 40 is provided with an inverted U-shaped bracket 530. The backrest 52 of the driver seat 501 is supported backwards on the inverted U-shaped bracket 530. For example, the rear surface of the backrest 52 is provided with a corresponding inverted U-shaped groove, and the inverted U-shaped bracket 530 fits into the inverted U-shaped groove. The backrest 52 of the driver seat 501 is provided with a driver seat bump 540 connected (for example, connected by bolts) with the rear bottom horizontal bar 624. Two driver seat bumps 540 may be provided at an interval in the left-right direction. Therefore, the driver seat 501 can be reliably fixed, and the driving safety of the driver can be ensured.

As shown in FIG. 4, with respect to the passenger seat 502, the rear back horizontal bar 623 is provided with a hanger 550. The upper part of the backrest 52 of the passenger seat 502 is hung on the hanger 550. The lower part of the backrest of the passenger seat 502 is provided with the passenger seat bump 560 connected (for example, connected by bolts) with the rear bottom horizontal bar 624. Two passenger seat bumps 560 can be provided at an interval in the left-right direction. Therefore, the passenger seat 502 can be reliably fixed, and the driving safety of passengers can be ensured.

In some specific examples of the present disclosure, the all-terrain vehicle may further comprise a controller. The controller is provided in the power compartment 20, that is, the controller is provided in the rear part 33 of the vehicle frame 30. The controller may be electrically connected to the power train 200. The controller can know the working state of the power train 200, and then reasonably control the power train 200 to work according to the known information. Moreover, the controller is provided in the power compartment 20, which on the one hand, can reasonably utilize the space of the power compartment 20, and on the other hand, facilitate the controller to be connected to the power train 200 at the same time. The controller may be located on the upper right of the power train 200.

Specifically, as shown in FIGS. 1 and 2, the rear part 33 comprises two upper side beams 334. An upper cross beam 341 is connected between the front ends of the two upper side beams 334. The upper cross beam 341 and the upper side beam 334 on the right side are provided with a controller bracket 340 for mounting the controller. That is to say, the controller is mounted not only on the upper side beam 334 at the right side, but also on the upper cross beam 341 at the front side. The controller provided in this way has good mounting reliability. The number of controller brackets 340 can be multiple, for example, three. One of the three controller brackets 340 is provided on the upper right side beam 334, and the other two controller brackets 340 are provided on the right half of the upper cross beam 341. The controller with three-point fixing is more stable.

As shown in FIGS. 1 and 2, the rear part 33 comprises two lower side beams 331. The two lower side beams 331 are located below two upper side beams 334. The two lower side beams 331 are connected to the rear of the middle part 32, for example, the third outer side pipe 329. The distance between the two lower side beams 331 decreases from front to back. The two lower side beams 331 provided in this way can gradually reduce the space of the power compartment 20. The power compartment 20 can better mount and fix the power train 200, so that the structure thereof can be simpler. The distance between the two upper side beams 334 decreases from front to back. The two upper side beams 334 provided in this way can effectively support and fix the cargo hopper, and can better define the power compartment 20 with the two lower side beams 331, so that the space of the power compartment 20 is suitable and the power train 200 can be reasonably placed.

In some specific embodiments of the present disclosure, as shown in FIGS. 1, 2, and 5-8, the front ends of the two side beams 331 are connected to a third outer side pipe 329, and the third outer side pipe 329 is provided with a front mounting member 351 for mounting the power train 200.

In addition, an intermediate cross beam 332 is connected between the two lower side beams 331, and the intermediate cross beam 332 is provided with a rear mounting member 333 for mounting the power train 200.

The third outer side pipe 329 and the intermediate cross beam 332 can support and fix the power train 200. The front mounting member 351 can be connected to the front engine leg of the power train 200. There are two rear mounting members 333 distributed on the intermediate cross beam 332 at an interval in the left-right direction. The two rear mounting members 333 can be connected to the rear engine leg of the power train 200. Therefore, the engine of the power train 200 is stably fixed.

Furthermore, in order to strengthen the structural strength of the bottom of the rear part 33, so as to more reliably bear the power train 200, a rear lower longitudinal beam 342 is connected between each lower side beam 331 and the third outer side pipe 329. The rear lower longitudinal beam 342 can extend in the front-rear direction. The front end of the rear lower longitudinal beam 342 is connected to the third outer side pipe 329, and the rear end of the rear lower longitudinal beam 342 is connected to the lower side beam 331.

In a further embodiment of the present disclosure, as shown in FIGS. 1, 2, and 5-8, a detachable differential bracket 352 is connected between the two lower side beams 331. The differential bracket 352 can be mounted by bolts to connect the middle parts of the rear part 33 from left to right, thus increasing the left and right rigidity and strength of the vehicle frame 30, providing a fixed carrier for the differential, and increasing the assembly firmness of the differential on the vehicle frame 30.

In addition, a rear bottom plate 339 is connected between the two lower side beams 331. The rear bottom plate 339 can further bear the differential. The mounting reliability of the rear bottom plate 339 can be ensured by providing the rear bottom plate 339 between the two lower side beams 331.

Figure 9:
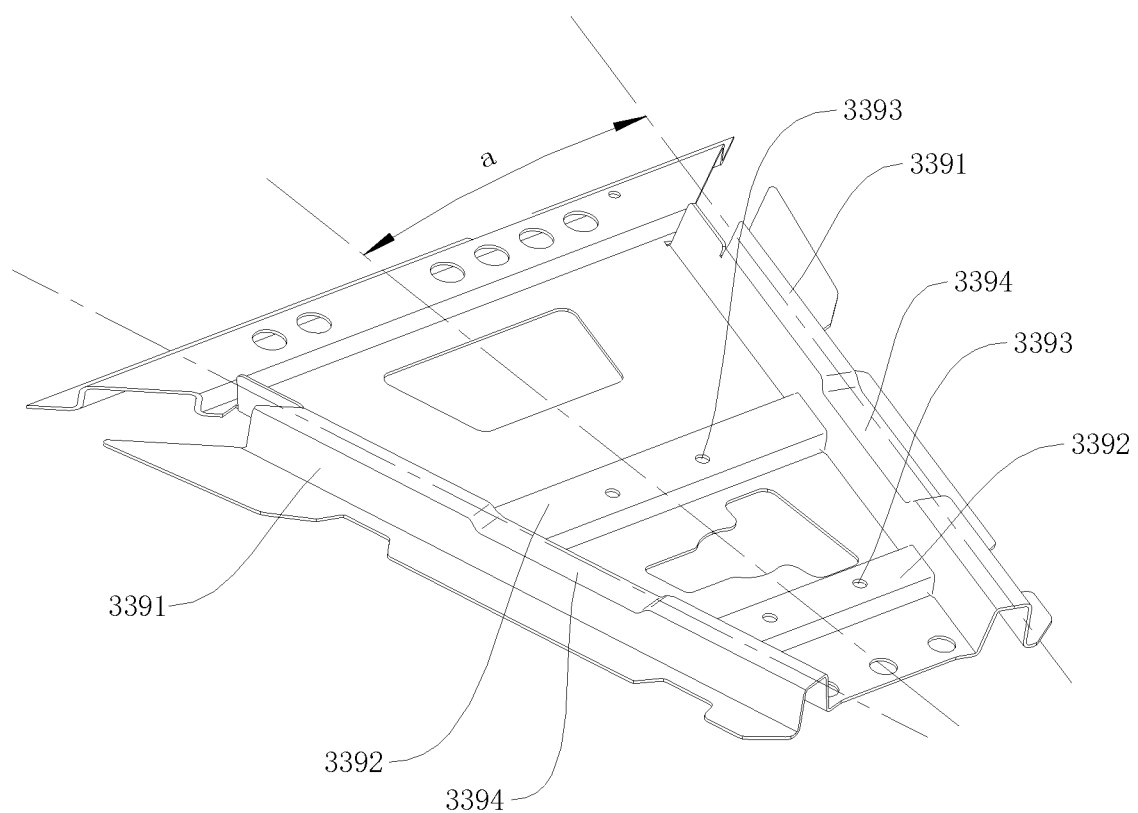
FIG. 9 is a schematic diagram of a rear bottom plate of a body of an all-terrain vehicle according to an embodiment of the present disclosure.

Specifically, as shown in FIG. 9, the rear bottom plate 339 is configured with two longitudinal reinforcing ribs 3391 and a plurality of transverse reinforcing ribs 3392. The distance between the two longitudinal reinforcing ribs 3391 gradually increases from back to front. The plurality of transverse reinforcing ribs 3392 are provided at an interval in the front-rear direction. Both ends of each transverse reinforcing rib 3392 are connected to the two longitudinal reinforcing ribs 3391, respectively, and the transverse reinforcing ribs 3392 are provided with differential mounting holes 393. The longitudinal reinforcing rib 3391 is provided with a pit 3394.

The rear bottom plate 339 can be made by stamping an integral sheet metal part. Two longitudinal reinforcing ribs 3391 with π-shaped cross sections are symmetrically provided left and right. Each longitudinal reinforcing rib 3391 is distributed at an included angle a with the center line extending in the front-rear direction, and a can be 5 degrees to 25 degrees, preferably 15 degrees. At the same time, the longitudinal reinforcing rib 3391 is also provided with a pit 3394, which plays a role in locally increasing strength. The rear base plate 339 is laterally and simultaneously provided with two transverse reinforcing ribs 3392 with π-shaped cross sections. Each transverse reinforcing rib 3392 is provided with two differential mounting holes 3393 for connecting with the differential. The rear bottom plate 339 has high functional integration, reliable integrated precision, light weight and low comprehensive cost.

In some specific examples of the present disclosure, as shown in FIGS. 5, 6, 8 and 14, a rear upper cross beam 353 and a detachable transverse bracket 354 are provided between the two upper side beams 334. Both ends of the rear upper cross beam 353 are connected to the rear ends of the two upper side beams 334, respectively. The transverse bracket 354 is located in front of the rear upper cross beam 353, and the rear upper cross beam 353 is provided with a muffler upper mounting plate 355. For example, the transverse bracket 354 can be mounted by bolts and nuts. The transverse bracket 354 and the rear upper cross member 353 enhance the transverse strength of the rear upper part of the vehicle frame 30. Moreover, the transverse bracket 354 is detachable, which can facilitate the whole hoisting of the power train 200. The rear upper cross member 353 also provides an upper mounting point for the muffler 400.

Furthermore, as shown in FIG. 1, a detachable middle horizontal bar 335 is provided between the two upper side beams 334. The middle horizontal bar 335 is provided with a top mounting member 336 for mounting the power train 200. The top mounting member 336 is used to fix the cylinder head of the engine 220. The top mounting member 336 is a cylinder head lug. That is to say, on the basis of mounting and fixing the bottom of the engine of the power train 200, the engine also fixes the cylinder head thereof through the top mounting member 336. The power train 200 provided in this way can better ensure the stability in the power compartment 20. The top mounting member 336 may be provided with a damping block to reduce the vibration transmitted from the engine to the vehicle frame 30.

In some embodiments of the present disclosure, as shown in FIGS. 1, 2, and 6-8, a left rear mounting vertical beam of a rear rocker arm 371 is connected between an upper side beam 334 and a lower side beam 331 located on one side (for example, the left side), and the lower side beam 331 is provided with a left front mounting plate of the rear rocker arm 372 located in front of the left rear mounting vertical beam of the rear rocker arm 371, and the left front mounting plate of the rear rocker arm 372 is disconnected from the upper side beam 334, that is, the left front mounting plate of the rear rocker arm 372 is not connected to the upper side beam 334 thereabove.

A right rear mounting vertical beam of the rear rocker arm 373 is connected between the upper side beam 334 and the lower side beam 331 located on the other side (for example, the right side), and the lower side beam 331 is provided with a right front mounting plate of the rear rocker arm 374 located in front of the right rear mounting vertical beam of the rear rocker arm 373. The right front mounting plate of the rear rocker arm 374 is disconnected from the upper side beam 334, that is, the right front mounting plate of the rear rocker arm 374 is not connected to the upper side beam 334 thereabove.

Further, the lower side beam on one side (for example, the left side) is provided with a left reinforcing plate 375 connecting the left front mounting plate of the rear rocker arm 372 and the left rear mounting vertical beam of the rear rocker arm 371, and the lower side beam 331 on the other side (for example, the right side) is provided with a right reinforcing plate 376 connecting the right front mounting plate of the rear rocker arm 374 and the right rear mounting vertical beam of the rear rocker arm 373.

Therefore, the left rear mounting vertical beam of the rear rocker arm 371, the left front mounting plate of the rear rocker arm 372, the right rear mounting vertical beam of the rear rocker arm 373 and the right front mounting plate of the rear rocker arm 374 are provided, which can provide the rear rocker arm with mounting points. Moreover, the left front mounting plate of the rear rocker arm 372 and the right front mounting plate of the rear rocker arm 374 are disconnected, that is, the left front mounting plate of the rear rocker arm 372 and right front mounting plate of the rear rocker arm 374 are not connected to the two upper side beams 334 thereabove, but are connected to the left rear mounting vertical beam of the rear rocker arm 371 and the right rear mounting vertical beam of the rear rocker arm 373 through the left reinforcing plate 375 and the right reinforcing plate 376, respectively, so that the local strength can be increased. The space at the upper part of the left front mounting plate of the rear rocker arm 372 and the right front mounting plate of the rear rocker arm 374 is fully utilized, so that different power trains can be arranged, the strength is increased, and the weight is reduced.

As shown in FIG. 3, the body of the all-terrain vehicle comprises a left rear suspension 380 and a right rear suspension 390.

Specifically, the left rear suspension 380 comprises a left wheel axle support 381, an upper left rocker arm 382, a lower left rocker arm 383 and a left shock absorber 384. The upper left rocker arm 382, the lower left rocker arm 383 and the left shock absorber 384 are all connected to the left wheel axle support 381. The front end of the upper left rocker arm 382 and the front end of the lower left rocker arm 383 are mounted on the left front mounting plate of the rear rocker arm 372. The rear end of the upper left rocker arm 382 and the rear end of the lower left rocker arm 383 are mounted on the left rear mounting vertical beam of the rear rocker arm 371. The upper end of the left shock absorber 384 is mounted to the corresponding upper side beam 334.

The rear suspension 390 comprises a right wheel axle support, an upper right rocker arm, a lower right rocker arm and a right shock absorber. The upper right rocker arm, the lower right rocker arm and the right shock absorber are all connected to the right wheel axle support. The front end of the upper right rocker arm and the front end of the lower right rocker arm are mounted to the right front mounting plate of the rear rocker arm 374. The rear end of the upper right rocker arm and the rear end of the lower right rocker arm are mounted to the right rear mounting vertical beam of the rear rocker arm 373. The upper end of the right shock absorber is mounted to the corresponding upper side beam 334.

It can be understood by those skilled in the art that the specific structure of the right rear suspension 390 is not marked for clarity of the drawings, and the specific structure of the right rear suspension 390 can refer to the left rear suspension 380. The right rear suspension and the left rear suspension are symmetrically provided in the left-right direction.

The distance between the left rear mounting vertical beam of the rear rocker arm 371 and the right rear mounting vertical beam of the rear rocker arm 373 decreases from top to bottom. The left rear mounting vertical beam of the rear rocker arm 371 and right rear mounting vertical beam of the rear rocker arm 373 provided in this way can change the mounting axis positions of the upper left rocker arm 382 and the lower left rocker arm 383, and the mounting axis positions of the upper right rocker arm and the lower right rocker arm, thereby improving the structural stability of the rear part 33 and prolonging the service life of the vehicle frame 30.

Figure 8:
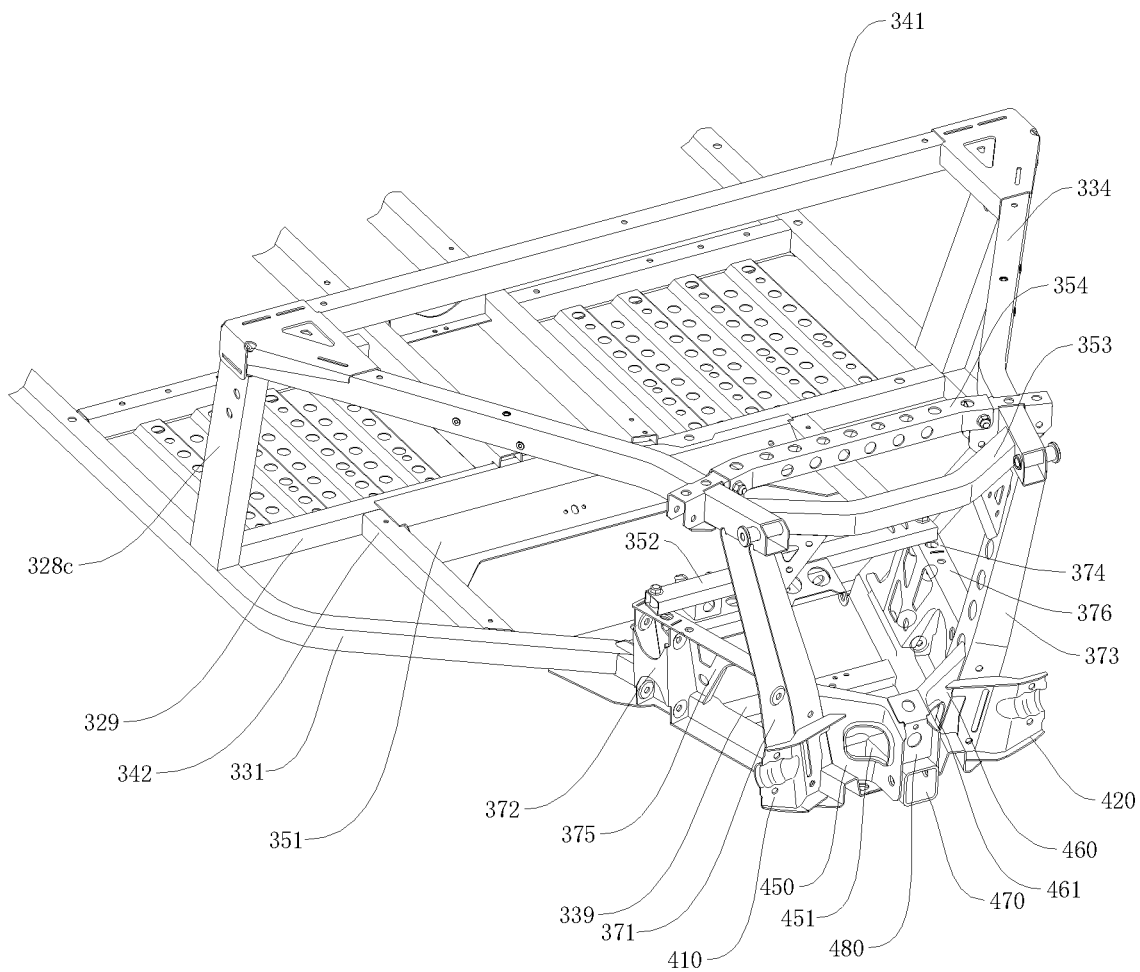
Figure 13:
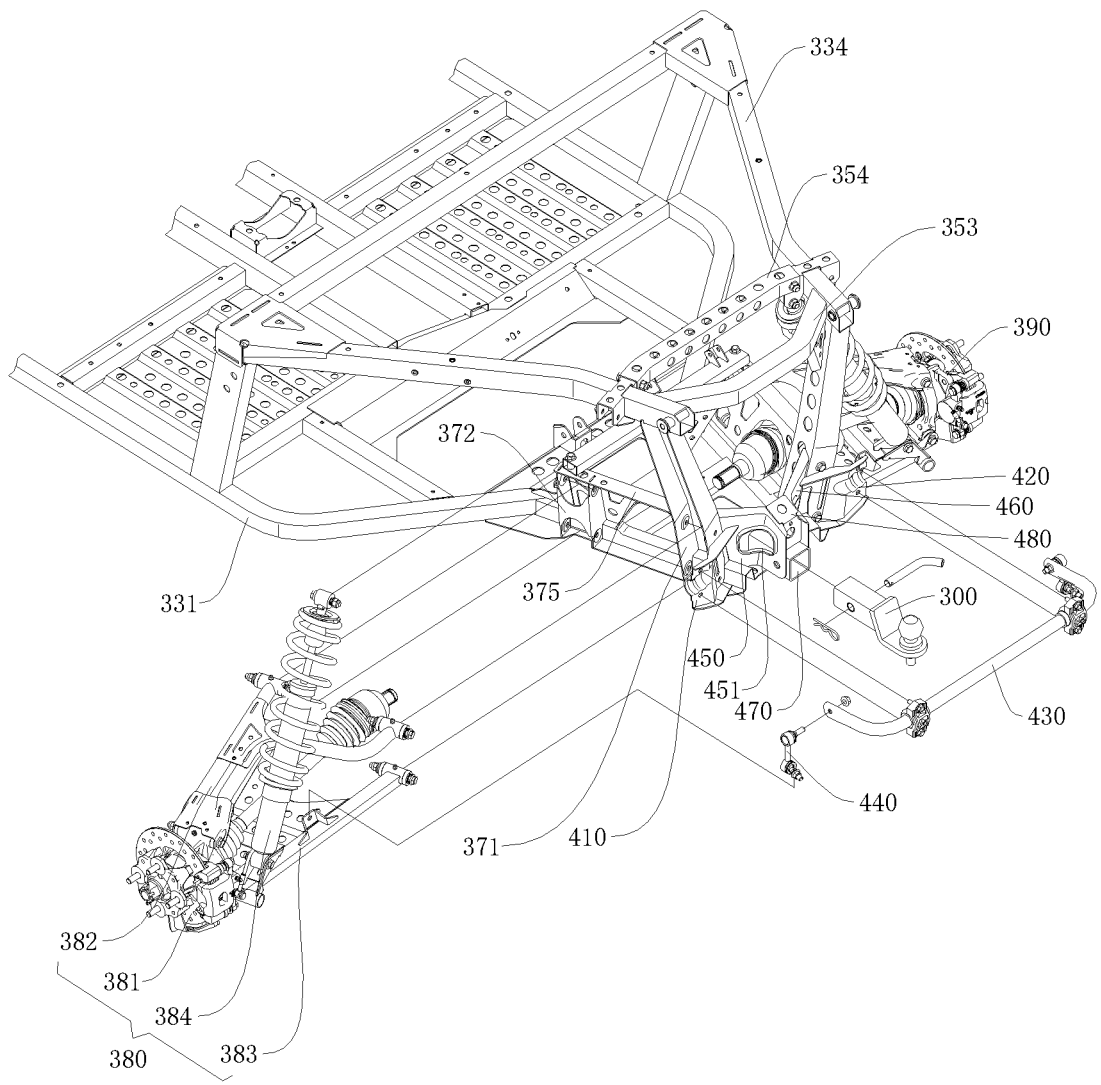
FIG. 13 is a schematic layout diagram of a rear suspension of a body of an all-terrain vehicle according to an embodiment of the present disclosure.

In some specific examples of the present disclosure, as shown in FIGS. 8 and 13, the lower end of the left rear mounting vertical beam of the rear rocker arm 371 is provided with a left mounting seat of a rear stabilizer bar 410, and the lower end of the right rear mounting vertical beam of the rear rocker arm 373 is provided with a right mounting seat of a rear stabilizer bar 420. A rear stabilizer bar 430 is connected between the left mounting seat of the rear stabilizer bar 410 and the right mounting seat of the rear stabilizer bar 420. Both ends of the rear stabilizer bar 430 are bent forward and are connected to the lower left rocker arm 383 and the lower right rocker arm through connecting rods 440, respectively. Therefore, the left mounting seat of the rear stabilizer bar 410 and the right mounting seat of the rear stabilizer bar 420 are provided by the left rear mounting vertical beam of the rear rocker arm 371 and the right rear mounting vertical beam of the rear rocker arm 373, thus providing a fixed carrier for the rear stabilizer bar 430, and further increasing the driving stability of the all-terrain vehicle.

Furthermore, a left mounting plate 450 is provided at the lower end of the left rear mounting vertical beam of the rear rocker arm 371, and a right mounting plate 460 is provided at the lower end of the right rear mounting vertical beam of the rear rocker arm 373. A towing mounting seat 470 is provided between the left mounting plate 450 and the right mounting plate 460, and the rear towing apparatus 300 can be mounted to the towing mounting seat 470.

The left mounting plate 450 is provided with a left avoidance hole 451, the right mounting plate 460 is provided with a right avoidance hole 461, and the rear stabilizer bar 430 passes through the left avoidance hole 451 and the right avoidance hole 461.

Figure 14:
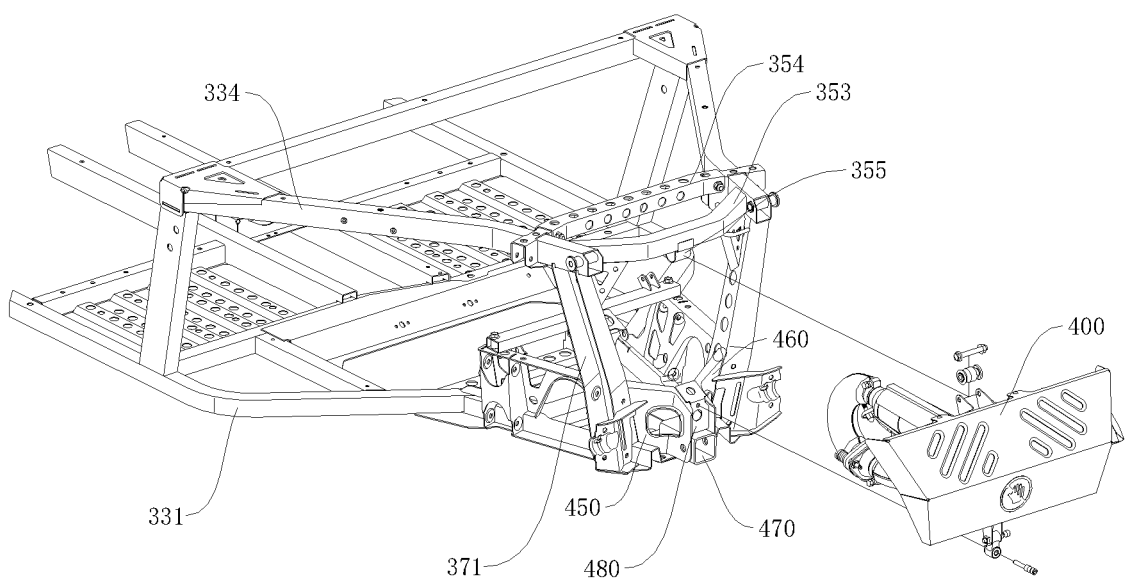
FIG. 14 is a schematic layout diagram of a muffler of a body of an all-terrain vehicle according to an embodiment of the present disclosure.

Furthermore, as shown in FIG. 14, a muffler lower mounting plate 480 is further provided between the left mounting plate 450 and the right mounting plate 460, and the muffler lower mounting plate 480 is located above the towing mounting seat 470. The upper part of the muffler 400 can be connected to the muffler upper mounting plate 355 through shock absorbing sleeves, bolts and nuts, and the lower part of the muffler 400 can be connected to the muffler lower mounting plate 480 through shock absorbing sleeves and broken neck bolts, so that the muffler 400 can be mounted and fixed. The internal space of the vehicle frame 30 is not occupied, so that enough space is reserved for the power compartment 20 to be suitable for mounting different power trains.

The left mounting plate 450 and the right mounting plate 460 are arranged at the rear part of the vehicle frame 30. The left mounting plate 450 and the right mounting plate 460 are connected to the left rear mounting vertical beam of the rear rocker arm 371 and the right rear mounting vertical beam of the rear rocker arm 373, and are connected through the towing mounting seat 470 and the muffler lower mounting plate 480 in the middle, so that the rear part of the vehicle frame 30 is connected integrally with high strength. Moreover, the left mounting plate 450 is provided with a left avoidance hole 451, and the right mounting plate 460 is provided with a right avoidance hole 461, which further increases the structural strength and reduces the weight. The rear stabilizer bar 430 passes through the left avoidance hole 451 and the right avoidance hole 461, so that the structure is more compact, and the space utilization rate is high.

The arrangement of different power trains 200 on the vehicle frame 30 of the embodiment of the present disclosure will be described hereinafter by way of example.

Figure 10:
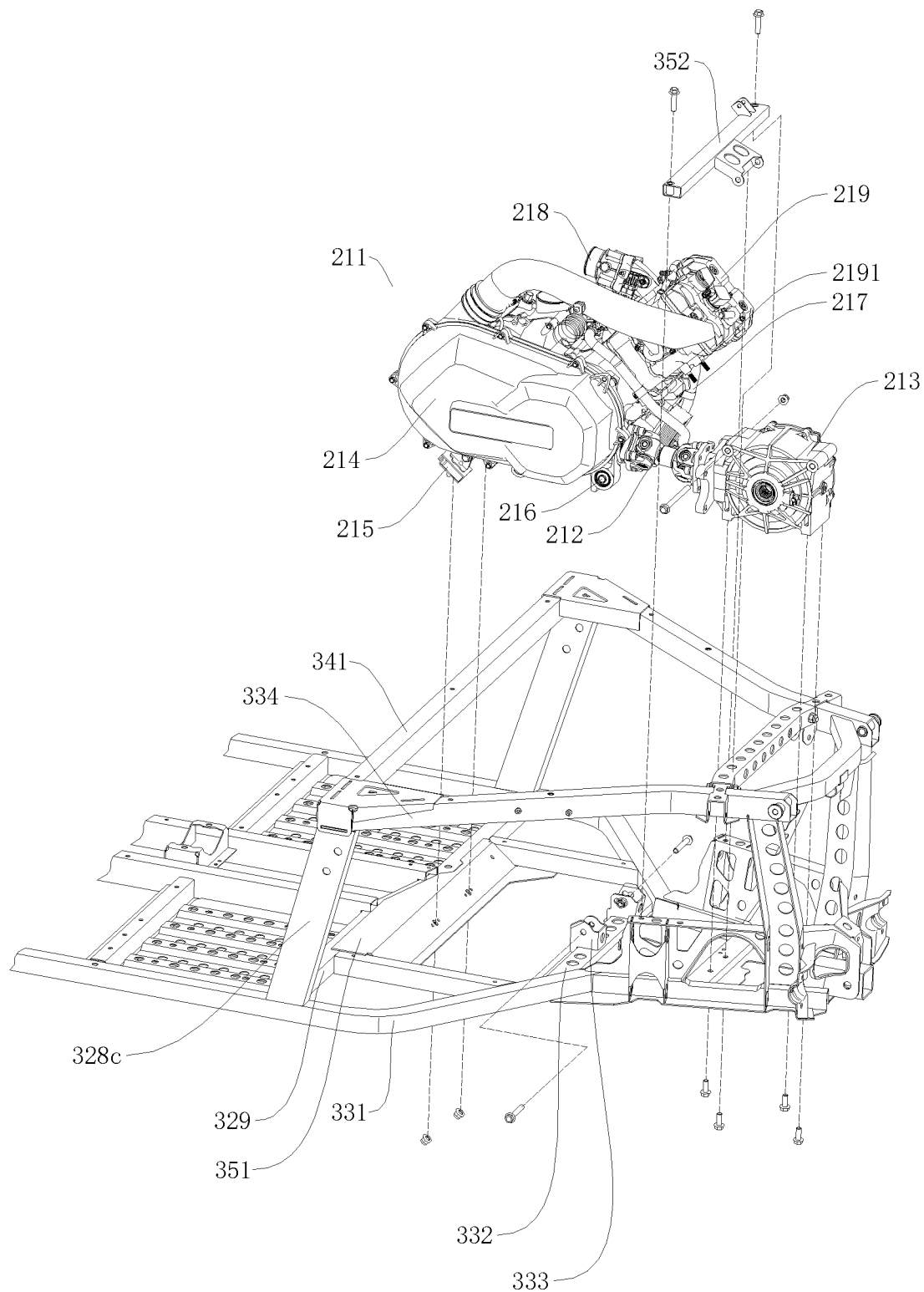
FIG. 10 is a schematic layout diagram of a hybrid power train of a body of an all-terrain vehicle according to an embodiment of the present disclosure.

FIG. 10 shows the arrangement of a hybrid power train. The hybrid power train comprises an engine 211, a rear transmission shaft 212, a differential 213, etc. The hybrid power train further comprises a CVT transmission system 214 provided on one side of the engine 211 and placed in the front-rear direction, and a generator 217 provided on the other side of the engine 211. The motor shaft of the generator 217 is connected to the crankshaft of the engine 211 through splines or in other ways to realize power transmission. Here, the generator 217 can be used for power output, or can only generate electricity under the drive of the engine 211. The engine 211 comprises a front engine leg 215 and a rear engine leg 216. The front engine leg 215 is fixed to the front mounting member 351 by bolts and nuts, and the rear engine leg 216 is fixed to the rear mounting member 333 by bolts and nuts. After being based on a platform, the vehicle frame 30 can be matched with different power trains, which can be realized only by replacing different engine legs. The differential 213 is assembled by bolts from bottom to top, and the front upper part is assembled with the differential bracket 352 by bolts and nuts.

The CVT transmission system 214 faces the left side of the body, the generator 217 faces the right side of the body, and the intake manifold 218 faces the front of the body, so as to improve the intake efficiency. The cylinder head 219 is inclined at a certain angle and faces the rear of the body to reduce the height space of the power train. The exhaust port 2191 is inclined at a certain angle and faces the rear of the body, so that the exhaust heat radiates backward and the influence of heat on the operator cabin 10 is reduced.

Figure 11:
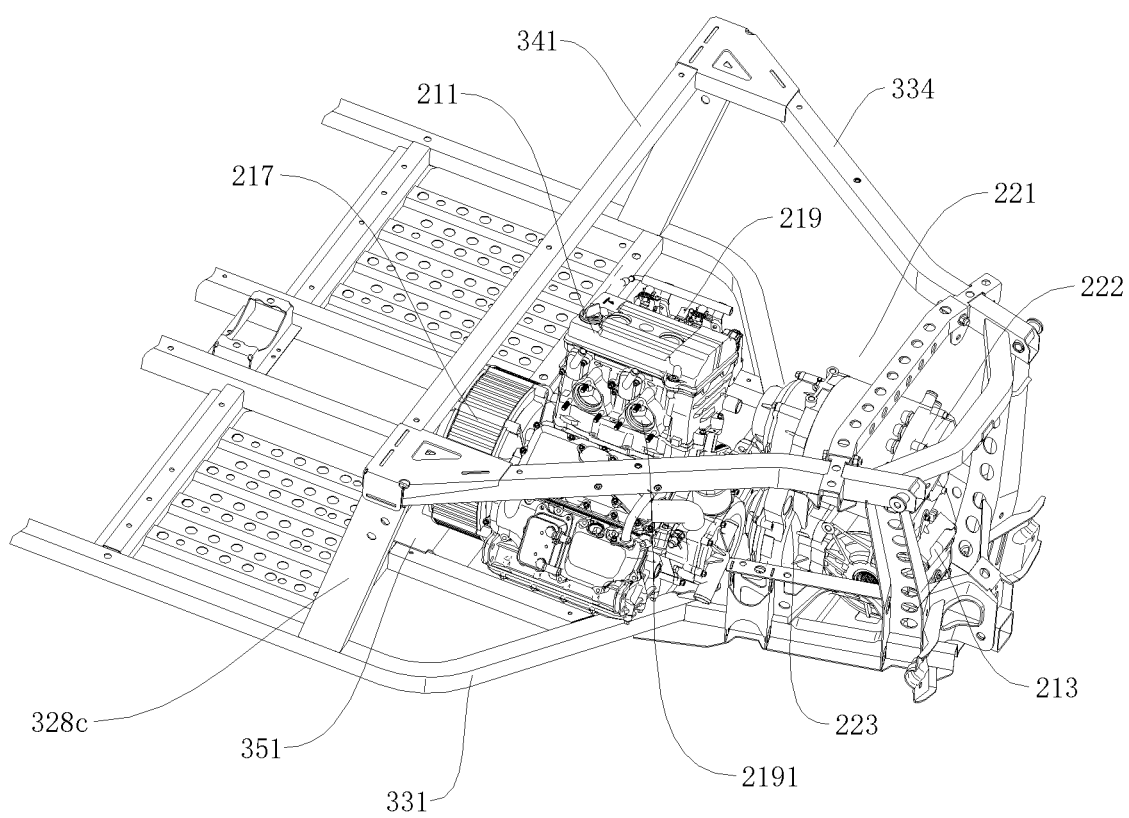
FIG. 11 is a schematic layout diagram of an extended-range power train of a body of an all-terrain vehicle according to an embodiment of the present disclosure.

FIG. 11 shows the arrangement of the extended-range power train. The extended-range power train comprises an engine 211, a cylinder head 219, an exhaust port 2191, a generator 217, a power output system 221, a motor 222, a gearbox 223, a differential 213, and the like.

The generator 217 is provided on the front side of the engine 211, that is, facing the front of the body. The motor shaft of the generator 217 is connected to the crankshaft of the engine 211 through splines or in other ways to realize power transmission. Here, the generator 217 only generates electricity only under the drive of the engine 211 to drive the motor 222, and the motor 222 located behind the engine 211 outputs power. The exhaust port 2191 faces the left side of the body, and the motor 222 is provided directly above the differential 213. This arrangement is compact in structure and makes full use of the space above the differential 213 to provide the motor 222. As the size of the motor 222 is directly positively correlated to the motor power, the power and torque of the whole vehicle are greatly improved.

Figure 12:
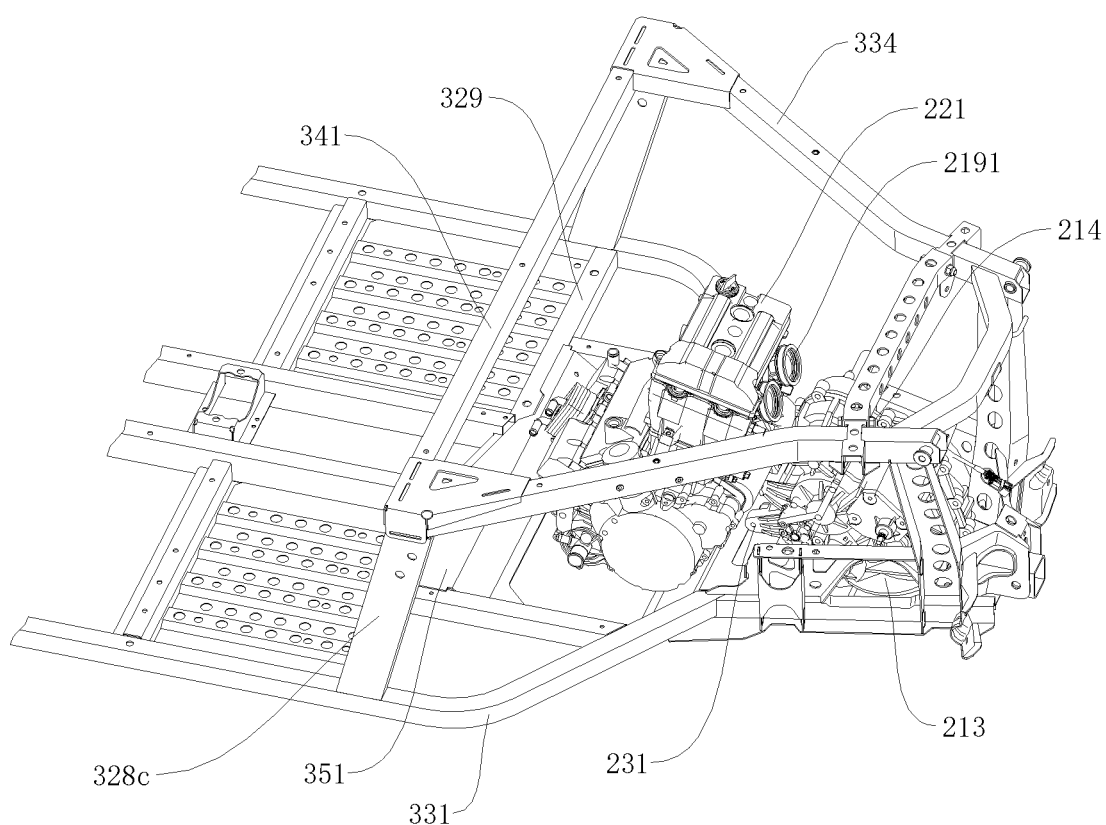
FIG. 12 is a schematic layout diagram of a fuel-type power train of a body of an all-terrain vehicle according to an embodiment of the present disclosure.

FIG. 12 shows the arrangement of a fuel-type power train. The fuel-type power train comprises an engine 211, an exhaust port 2191, a gearbox 231, a differential 213, a CVT transmission system 214, and the like.

The gearbox 231 faces the left side of the body, the CVT transmission system 214 faces the right side of the body, and the exhaust port 2191 faces the rear of the body, so as to facilitate the arrangement of the muffler 400. The differential 213 and the engine 211 are integrated, which has a compact overall structure, high integration and small occupied space.

The above different layout schemes of the power train 200 are realized on the platform-based frame 30. The left rear suspension 380, the right rear suspension 390, the rear stabilizer bar 430 and the rear towing apparatus 300 do not need to be modified, thus realizing the flexible layout of the product line of the whole vehicle.

According to the body of the all-terrain vehicle of the embodiment of the present disclosure, the power compartment 20 of the vehicle frame 30 is based on a platform and a module. The fact that the arrangement of different power trains, the fuel-type power trains with different displacements, the hybrid power trains with different powers, etc. can be fully compatible is taken into full consideration. Moreover, sufficient space is predictably reserved to solve the mounting of the power trains. Moreover, the suspension system and the rear stabilizer bar 430 are completely unified, that is, the suspension systems are completely consistent with each other with different power trains. Because the vehicle frame 30 is based on a platform, the later product line expansion and iteration process is accelerated, the R&D efficiency is improved, the cost of R&D, manufacturing and management is reduced, the product consistency is effectively guaranteed, the failure rate of each component system is effectively controlled, and the product quality is improved.

In addition, the layout of the rear suspension system is fully taken into account in the design of the power compartment 20, the space design is compact, and the motion parameters of the suspension are effectively optimized, so that the off-road performance of the vehicle is improved, the driving comfort is increased, and the reliability of the rear suspension system is improved.

In the description of the present disclosure, it should be understood that the orientational or positional relationship indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "anti-clockwise", "axial", "radial" "circumferential" is based on the orientational or positional relationship shown in the attached drawings, which is only used for the convenience of describing the present disclosure and simplifying the description, rather than indicating or implying that the referred apparatuses or elements must have a specific orientation, be constructed and operated in a specific orientation, and therefore should not be construed as limiting the present disclosure.

In the description of the present disclosure, "a first feature" and "a second feature" may include one or more of these features. In the description of the present disclosure, "a plurality of" means two or more. In the description of the present disclosure, the first feature is "above" or "below" the second feature, which may include the fact that the first feature and the second feature are in direct contact, or the first feature and the second feature are not in direct contact but in contact with each other through another feature. In the description of the present disclosure, the first feature is "above", "on top of" and "on" the second feature, which may include the fact that the first feature is directly above and obliquely above the second feature, or only indicate that the horizontal height of the first feature is higher than that of the second feature.

In the description of this specification, the description referring to the terms such as "one embodiment", "some embodiments", "illustrative embodiments", "examples", "specific examples" or "some examples" means that the specific features, structures, materials or characteristics described in conjunction with the embodiment or example are included in at least one embodiment or example of the present disclosure. In this specification, the schematic expressions of the above terms do not necessarily refer to the same embodiment or example.

Although the embodiments of the present disclosure have been shown and described, those skilled in the art can understand that many changes, modifications, substitutions and variations can be made to these embodiments without departing from the principles and purposes of the present disclosure, and the scope of the present disclosure is defined by the claims and their equivalents.

What is claimed is:

1. A body of an all-terrain vehicle, comprising:
a vehicle frame, wherein the vehicle frame comprises a front part, a middle part and a rear part which are connected in sequence, the rear part is provided with a power compartment for accommodating a power train, the front part comprises a lower mounting frame and an upper support frame, the lower mounting frame is connected to the middle part, and the upper support frame is detachably connected to both the lower mounting frame and the middle part; and
a seat frame, wherein the seat frame is detachably provided in the middle part and defines a mounting space for a plurality of components with a bottom of the middle part;
wherein the rear part comprises two lower side beams, the two lower side beams are connected to a rear of the middle part, and the distance between the two lower side beams decreases from front to back;
the rear part further comprises two upper side beams, the two upper side beams are connected to the rear of the middle part, the two upper side beams are located above the two lower side beams, and the distance between the two upper side beams decreases from front to back;

a left rear mounting vertical beam of a rear rocker arm is connected between the upper side beam and the lower side beam on one side, and a right rear mounting vertical beam of the rear rocker arm is connected between the upper side beam and the lower side beam on the other side; and the lower end of the left rear mounting vertical beam of the rear rocker arm is provided with a left mounting plate, the lower end of the right rear mounting vertical beam of the rear rocker arm is provided with a right mounting plate, and a towing mounting seat is provided between the left mounting plate and the right mounting plate; and the left mounting plate is provided with a left avoidance hole, the right mounting plate is provided with a right avoidance hole, and a rear stabilizer bar passes through the left avoidance hole and the right avoidance hole.

2. The body of the all-terrain vehicle according to claim 1, wherein the middle part comprises an outer side pipe, an inner longitudinal beam and a bottom plate, the inner longitudinal beam is located inside the outer side pipe, and the bottom plate is connected between the outer side pipe and the inner longitudinal beam, and the bottom plate forms the bottom of the mounting space.

3. The body of the all-terrain vehicle according to claim 2, wherein a number of the inner longitudinal beam is two, the two inner longitudinal beams are disposed transversely opposite to each other, and a mounting space for a transmission shaft of the all-terrain vehicle is defined by the two inner longitudinal beams.

4. The body of the all-terrain vehicle according to claim 3, wherein a number of the outer side pipe is plural, the plurality of outer side pipes are connected in sequence, the outer side pipe on the front side is connected to the front end of the inner longitudinal beam, and the outer side pipe on the rear side is connected to the rear end of the inner longitudinal beam.

5. The body of the all-terrain vehicle according to claim 4, wherein the plurality of outer side pipes comprise a first outer side pipe, a second outer side pipe and a third outer side pipe, a number of the first outer side pipe is two and a number of the second outer side pipe is two, the two first outer side pipes and the two second outer side pipes are both disposed outside the two inner longitudinal beams, the first outer side pipe is obliquely connected between the inner longitudinal beam and the second outer side pipe, and the third outer side pipe is connected to the rear end of the two inner longitudinal beams, and both ends of the third outer side pipe are connected to two of the second outer side pipes; and wherein the middle part further comprises a front inclined pipe and a front support frame, the front support frame is connected to the first outer side pipe, the front inclined pipe extends obliquely forward from bottom to top, the lower end of the front inclined pipe is detachably connected to the junction of the first outer side pipe and the second outer side pipe, and the upper end of the front inclined pipe is connected to the upper part of the front support frame.

6. The body of the all-terrain vehicle according to claim 4, wherein the middle part further comprises a rear inclined pipe, the rear inclined pipe extends obliquely backward from bottom to top, the lower end of the rear inclined pipe is connected to the rear end of the second outer side pipe, and the upper part of the rear inclined pipe is jointly connected to an upper cross beam.

7. The body of the all-terrain vehicle according to claim 6, further comprising: a roll cage, wherein the roll cage is mounted at the middle part, and an operator cabin is defined jointly by the roll cage and the middle part; and wherein the roll cage comprises: a side fence, wherein the side fence is connected to the rear inclined pipe, and the side fence is connected to the front inclined pipe to form a closed loop.

8. The body of the all-terrain vehicle according to claim 7, wherein the side fence comprises:

a front upper pipe segment, wherein the front upper pipe segment extends to the top and front of the operator cabin, and the lower end of the front upper pipe segment is connected to the upper end of the front inclined pipe;

a rear pipe segment, wherein the rear pipe segment extends to the rear of the operator cabin, the upper end of the rear pipe segment is connected to the rear end of the front upper pipe segment, and the lower part of the rear pipe segment is connected to the rear inclined pipe; and a lower pipe segment, wherein the lower pipe segment extends to the bottom of the operator cabin, the front end of the lower pipe segment is detachably connected to the lower end of the front inclined pipe, and the rear end of the lower pipe segment is detachably connected to the lower end of the rear pipe segment.

9. The body of the all-terrain vehicle according to claim 1, wherein the front ends of the two lower side beams are connected to a third outer side pipe, and the third outer side pipe is provided with a front mounting member for mounting the power train.

10. The body of the all-terrain vehicle according to claim 9, wherein an intermediate cross beam is connected between the two lower side beams, and the intermediate cross beam is provided with a rear mounting member for mounting the power train, wherein a detachable differential bracket is connected between the two lower side beams, wherein a rear bottom plate is connected between the two lower side beams; and wherein the power train comprises an engine, a number of the rear mounting member is two, and the two rear mounting members are provided at an interval.

11. The body of the all-terrain vehicle according to claim 10, wherein the rear bottom plate is configured with two longitudinal reinforcing ribs and a plurality of transverse reinforcing ribs, the distance between the two longitudinal reinforcing ribs gradually increases from back to front, the plurality of transverse reinforcing ribs are provided at intervals in the front-rear direction, both ends of each of the transverse reinforcing rib are connected to the two longitudinal reinforcing ribs, respectively, the transverse reinforcing ribs are provided with differential mounting holes, and the longitudinal reinforcing ribs are provided with pits.

12. The body of the all-terrain vehicle according to claim 10, wherein a detachable middle horizontal bar is provided between the two upper side beams, the middle horizontal bar is provided with a top mounting member for mounting the power train, the power train comprises an engine, and the top mounting member is used for fixing a cylinder head of the engine.

13. The body of the all-terrain vehicle according to claim 12, wherein a rear upper cross beam and a detachable transverse bracket are provided between the two upper side beams, both ends of the rear upper cross beam are connected to the rear ends of the two upper side beams, respectively, the transverse bracket is located in front of the rear upper cross beam, and the rear upper cross beam is provided with a muffler upper mounting plate.

14. The body of the all-terrain vehicle according to claim 12, wherein for the upper side beam and the lower side beam on one side, the lower side beam is provided with a left front mounting plate of a rear rocker arm which is located in front of the left rear mounting vertical beam of the rear rocker arm and disconnected from the upper side beam; and for the upper side beam and the lower side beam on the other side, the lower side beam is provided with a right front mounting plate of the rear rocker arm which is located in front of the right rear mounting vertical beam of the rear rocker arm and disconnected from the upper side beam.

15. The body of the all-terrain vehicle according to claim 14, further comprising:

a left rear suspension, wherein the left rear suspension comprises a left wheel axle support, an upper left rocker arm, a lower left rocker arm and a left shock absorber, the upper left rocker arm, the lower left rocker arm and the left shock absorber are all connected to the left wheel axle support, the front end of the upper left rocker arm and the front end of the lower left rocker arm are mounted on the left front mounting plate of the rear rocker arm, the rear end of the upper left rocker arm and the rear end of the lower left rocker arm are mounted on the left rear mounting vertical beam of the rear rocker arm, and the upper end of the left shock absorber is mounted on the corresponding upper side beam; and a right rear suspension, wherein the right rear suspension comprises a right wheel axle support, an upper right rocker arm, a lower right rocker arm and a right shock absorber, the upper right rocker arm, the lower right rocker arm and the right shock absorber are all connected to the right wheel axle support, the front end of the upper right rocker arm and the front end of the lower right rocker arm are mounted on the right front mounting plate of the rear rocker arm, the rear end of the upper right rocker arm and the rear end of the lower right rocker arm are mounted on the right rear mounting vertical beam of the rear rocker arm, and the upper end of the right shock absorber is mounted on the corresponding upper side beam.

16. The body of the all-terrain vehicle according to claim 15, wherein the lower end of the left rear mounting vertical beam of the rear rocker arm is provided with a left mounting seat of the rear stabilizer bar, the lower end of the right rear mounting vertical beam of the rear rocker arm is provided with a right mounting seat of a rear stabilizer bar, a rear stabilizer bar is connected between the left mounting seat of the rear stabilizer bar and the right mounting seat of the rear stabilizer bar, and both ends of the rear stabilizer bar are connected to the lower left rocker arm and the lower right rocker arm through connecting rods, respectively.

17. The body of the all-terrain vehicle according to claim 16,
wherein a muffler lower mounting plate is further provided between the left mounting plate and the right mounting plate, and the muffler lower mounting plate is located above the towing mounting seat.

18. The body of the all-terrain vehicle according to claim 1, wherein the lower mounting bracket comprises a rocker arm bracket and a bottom sheet metal;
the middle part further comprises a front support frame, the rocker arm bracket is connected to the front end of the bottom sheet metal and the front end of the front support frame; and the lower end of the upper support frame is detachably mounted on the bottom sheet metal, and the rear end of the upper support frame is detachably mounted on the front support frame.

19. An all-terrain vehicle, comprising: a body and a hybrid power train, wherein the body comprises a vehicle frame and a seat frame, the vehicle frame comprises a front part, a middle part and a rear part which are connected in sequence, the rear part is provided with a power compartment for accommodating the hybrid power train, the front part comprises a lower mounting frame and an upper support frame, the lower mounting frame is connected to the middle part, and the upper support frame is detachably connected to both the lower mounting frame and the middle part;

wherein the seat frame is detachably provided in the middle part and defines a mounting space for a plurality of components with a bottom of the middle part; wherein the rear part comprises two lower side beams, the two lower side beams are connected to a rear of the middle part, and the distance between the two lower side beams decreases from front to back; the rear part further comprises two upper side beams, the two upper side beams are connected to the rear of the middle part, the two upper side beams are located above the two lower side beams, and the distance between the two upper side beams decreases from front to back; a left rear mounting vertical beam of a rear rocker arm is connected between the upper side beam and the lower side beam on one side, and a right rear mounting vertical beam of the rear rocker arm is connected between the upper side beam and the lower side beam on the other side; and the lower end of the left rear mounting vertical beam of the rear rocker arm is provided with a left mounting plate, the lower end of the right rear mounting vertical beam of the rear rocker arm is provided with a right mounting plate, and a towing mounting seat is provided between the left mounting plate and the right mounting plate; and the left mounting plate is provided with a left avoidance hole, the right mounting plate is provided with a right avoidance hole, and a rear stabilizer bar passes through the left avoidance hole and the right avoidance hole; and wherein the hybrid power train is provided in the power compartment, the hybrid power train comprises an engine, a Continuously Variable Transmission (CVT) transmission system and a generator, the CVT transmission system is provided on one side of the engine and provided in the front-rear direction, the generator is provided on the other side of the engine, and a motor shaft of the generator is connected to a crankshaft of the engine through splines.

20. An all-terrain vehicle, comprising: a body and an extended-range power train, wherein the body comprises a vehicle frame and a seat frame, the vehicle frame comprises a front part, a middle part and a rear part which are connected in sequence, the rear part is provided with a power compartment for accommodating the extended-range power train, the front part comprises a lower mounting frame and an upper support frame, the lower mounting frame is connected to the middle part, and the upper support frame is detachably connected to both the lower mounting frame and the middle part; wherein the seat frame is detachably provided in the middle part and defines a mounting space for a plurality of components with a bottom of the middle part; wherein the rear part comprises two lower side beams, the two lower side beams are connected to a rear of the middle part, and the distance between the two lower side beams decreases from front to back; the rear part further comprises two upper side beams, the two upper side beams are connected to the rear of the middle part, the two upper side beams are located above the two lower side beams, and the distance between the two upper side beams decreases from front to back; a left rear mounting vertical beam of a rear rocker arm is connected between the upper side beam and the lower side beam on one side, and a right rear mounting vertical beam of the rear rocker arm is connected between the upper side beam and the lower side beam on the other side; and the lower end of the left rear mounting vertical beam of the rear rocker arm is provided with a left mounting plate, the lower end of the right rear mounting vertical beam of the rear rocker arm is provided with a right mounting plate, and a towing mounting seat is provided between the left mounting plate and the right mounting plate; and the left mounting plate is provided with a left avoidance hole, the right mounting plate is provided with a right avoidance hole, and a rear stabilizer bar passes through the left avoidance hole and the right avoidance hole; and wherein the extended-range power train is provided in the power compartment, the extended-range power train comprises an engine, a generator and a motor, the generator is provided in front of the engine, a motor shaft of the generator is connected to a crankshaft of the engine through splines, and the motor is provided behind the engine.

* * * * *